United States Patent
Scaini et al.

(10) Patent No.: US 9,388,919 B2
(45) Date of Patent: Jul. 12, 2016

(54) A/R METHOD AND APPARATUS THEREFOR

(75) Inventors: Cristian Scaini, Azzano San Paolo (IT); Teresio Signaroldi, Sordio (IT); Kimon Tullio Ardavanis, San Donato Milanese (IT)

(73) Assignee: SAIPEM S.P.A., Milan (IT)

( * ) Notice: Subject to any disclaimer, the term of this patent is extended or adjusted under 35 U.S.C. 154(b) by 204 days.

(21) Appl. No.: 14/006,117

(22) PCT Filed: Mar. 20, 2012

(86) PCT No.: PCT/EP2012/054909
§ 371 (c)(1),
(2), (4) Date: Nov. 20, 2013

(87) PCT Pub. No.: WO2012/126908
PCT Pub. Date: Sep. 27, 2012

(65) Prior Publication Data
US 2014/0072370 A1  Mar. 13, 2014

(30) Foreign Application Priority Data

Mar. 21, 2011 (GB) .................................. 1104715.6

(51) Int. Cl.
*F16L 1/16* (2006.01)
*F16L 1/18* (2006.01)
*F16L 1/23* (2006.01)

(52) U.S. Cl.
CPC ................ *F16L 1/166* (2013.01); *F16L 1/161* (2013.01); *F16L 1/18* (2013.01); *F16L 1/23* (2013.01)

(58) Field of Classification Search
USPC .................................................. 405/158, 173
See application file for complete search history.

(56) References Cited

U.S. PATENT DOCUMENTS

| 3,944,120 A | 3/1976 | Bell et al. |
| 3,991,584 A | 11/1976 | Goldbach |
| 4,073,156 A | 2/1978 | Smith |
| 4,257,718 A * | 3/1981 | Rosa et al. .................... 405/167 |
| 4,687,378 A | 8/1987 | Jegousse et al. |
| 5,348,423 A | 9/1994 | Maloberti et al. |

(Continued)

FOREIGN PATENT DOCUMENTS

| EP | 1 850 043 A2 | 10/2007 |
| GB | 2 073 361 A | 10/1981 |

(Continued)

OTHER PUBLICATIONS

International Search Report (PCT/ISA/210) mailed on Oct. 17, 2012, by the European Patent Office as the International Searching Authority for International Application No. PCT/EP2012/054909.

(Continued)

*Primary Examiner* — Benjamin Fiorello
*Assistant Examiner* — Kyle Armstrong
(74) *Attorney, Agent, or Firm* — Buchanan Ingersoll & Rooney PC

(57) ABSTRACT

A method of abandoning a pipeline from an offshore vessel, wherein the method includes the steps of: providing a tubular member between a winch apparatus and the end of the pipeline being abandoned, the tubular member being received in a tensioning apparatus, and lowering the pipeline with the winch apparatus and the tensioning apparatus, the tensional load of the pipeline being held by the tensioning apparatus and the winch apparatus at the same time.

21 Claims, 27 Drawing Sheets

(56) References Cited

U.S. PATENT DOCUMENTS

| | | | |
|---|---|---|---|
| 5,421,674 A | 6/1995 | Maloberti et al. | |
| 5,975,802 A | 11/1999 | Willis | |
| 6,729,802 B2 * | 5/2004 | Giovannini et al. | 405/158 |
| 7,226,244 B1 | 6/2007 | De Groot et al. | |
| 2003/0091395 A1 * | 5/2003 | Stockstill | 405/154.1 |
| 2003/0099515 A1 | 5/2003 | Giovannini et al. | |
| 2012/0134751 A1 * | 5/2012 | Ardavanis et al. | 405/166 |
| 2013/0309018 A1 | 11/2013 | Mouchel et al. | |
| 2014/0294511 A1 * | 10/2014 | Bianchi et al. | 405/168.4 |

FOREIGN PATENT DOCUMENTS

| | | |
|---|---|---|
| GB | 2 434 627 A | 8/2007 |
| GB | 2488767 A * | 9/2012 |
| WO | WO 01/48410 A1 | 7/2001 |
| WO | 2006/085739 A1 | 8/2006 |
| WO | 2009/002142 A1 | 12/2008 |
| WO | 2010/081847 A1 | 7/2010 |
| WO | WO 2010/131096 A1 | 11/2010 |
| WO | 2010/139621 A2 | 12/2010 |
| WO | 2011/010207 A1 | 1/2011 |
| WO | 2011/048480 A1 | 4/2011 |
| WO | 2012/120381 A9 | 9/2012 |

OTHER PUBLICATIONS

Written Opinion (PCT/ISA/237) mailed on Oct. 17, 2012, by the European Patent Office as the International Searching Authority for International Application No. PCT/EP2012/054909.

International Preliminary Report on Patentability (PCT/IPEA/409) completion May 21, 2013, by the European Patent Office as the International Searching Authority for International Application No. PCT/EP2012/054909.

Great Britain Search Report issued on Jul. 7, 2011, by the Great Britain Patent Office in corresponding Great Britain Application No. 1104715.6 (6 pages).

Great Britain Search Report issued on Nov. 25, 2011, by the Great Britain Patent Office in corresponding Great Britain Application No. 1104715.6. (2 pages).

Great Britain Search Report issued on Nov. 28, 2011, by the Great Britain Patent Office in corresponding Great Britain Application No. 1104715.6. (2 pages).

* cited by examiner

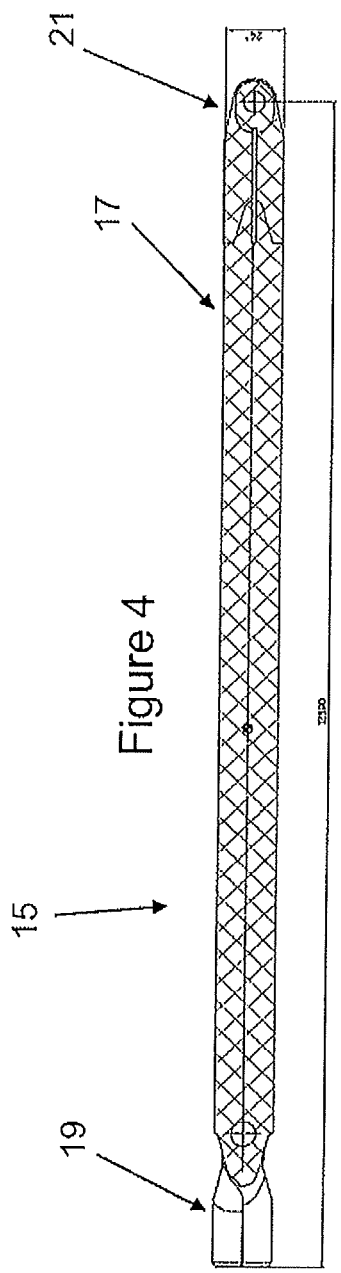
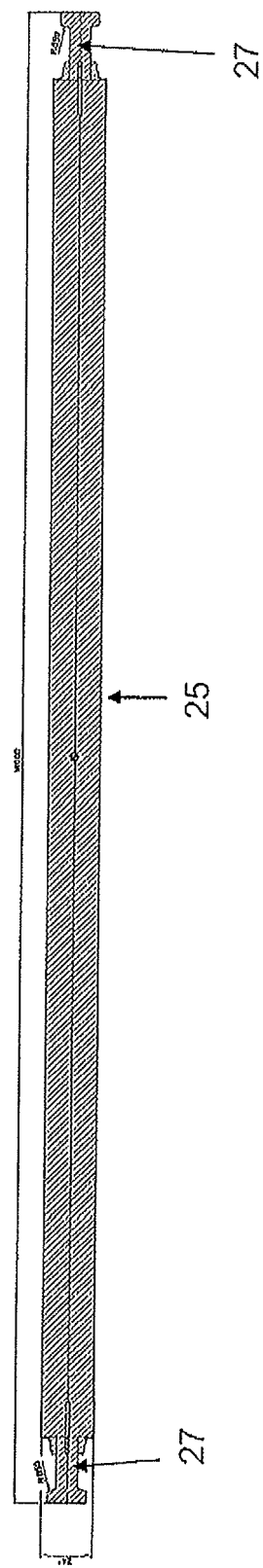
Figure 4
Figure 5

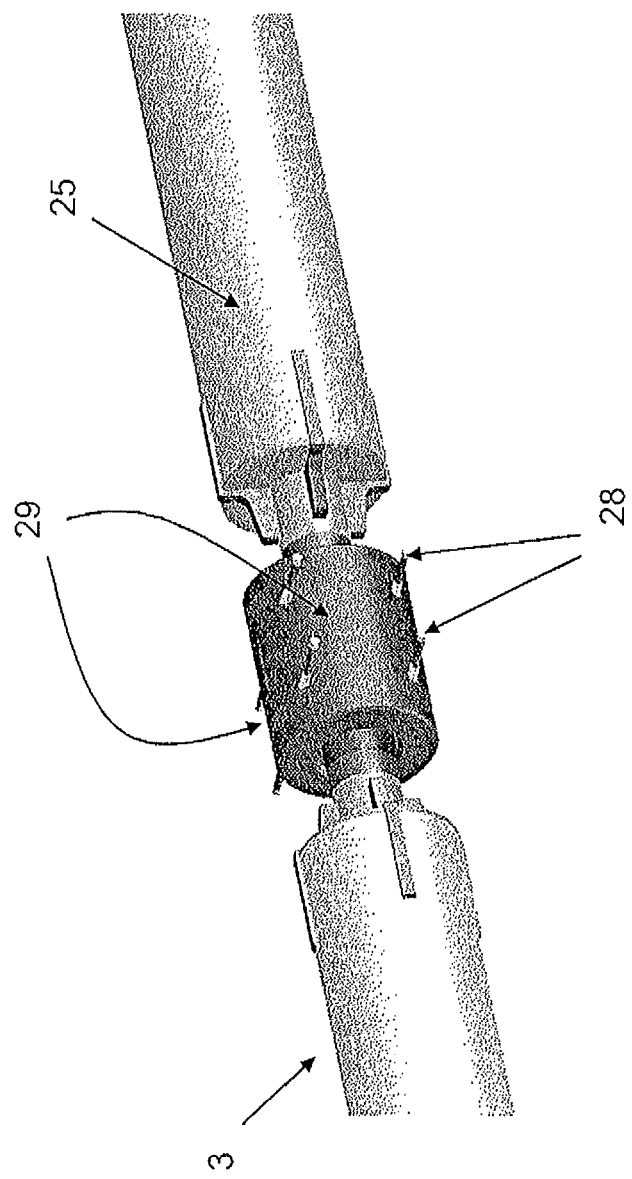

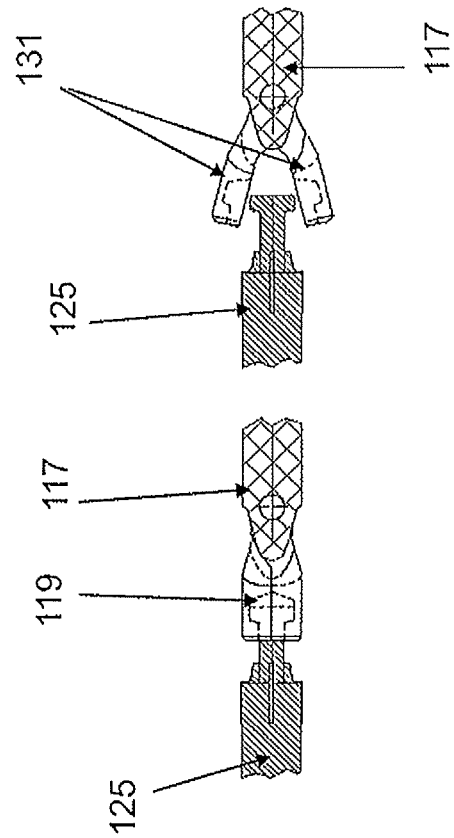
Figure 23a
Figure 23b
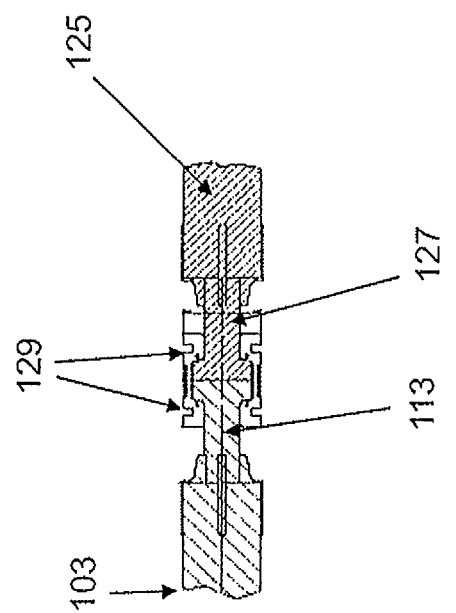
Figure 22

A/R METHOD AND APPARATUS THEREFOR

TECHNICAL FIELD

The present invention relates generally to the laying pipelines and in particular to a method of abandoning (or abandoning and recovering) a pipeline. The invention also relates to apparatus for use in such a method.

BACKGROUND OF THE INVENTION

During pipe laying it may be necessary to abandon a pipeline and recover it later. For example, a pipeline may need to be abandoned because of a failure during the laying process (for example a wet-buckle may occur, causing a flooded pipeline). When the pipeline becomes flooded, the tensional load of the pipeline may significantly increase.

Conventionally, abandonment and recovery of a flooded pipeline is carried out by a method such as: welding an abandonment/recovery head (A/R head) onto the end of the pipeline being laid; connecting a plurality of A/R winches and sheaves to the head; transferring pipeline tension from the pipeline tensioning arrangement on the laying vessel that is used during normal laying, to the winches; lowering the pipeline using the winches and laying the pipeline and A/R head on the seabed.

Use of this conventional A/R system causes problems. The total capacity of the A/R winches needs to be sufficient to be able to lower the flooded pipeline; this necessitates a plurality of winches, and/or one or more winches of especially high capacity. Using multiple winches and sheaves can also be complex, and difficult to control.

It is an object of the invention to provide a method and apparatus of laying a pipeline which overcomes or at least mitigates the above-mentioned problems.

SUMMARY OF THE INVENTION

According to a first aspect of the invention, there is provided a method of abandoning a pipeline from an offshore vessel, wherein the method comprises the steps of:
providing a tubular member between a winch apparatus and the end of the pipeline being abandoned, the tubular member being received in a tensioning apparatus, and
lowering the pipeline with the winch apparatus and the tensioning apparatus, the tensional load of the pipeline being distributed between the tensioning apparatus and the winch apparatus during lowering. By providing a tubular member received in the tensioning apparatus, the tensioning apparatus may be used to take some of the tensional load of the pipeline. The total load may therefore be distributed between the tensioning apparatus and the winch apparatus, allowing the capacity of the winch apparatus to be less than the winch apparatus of the conventional arrangement described above.

The tubular member is any member that is receivable and tensionable in the tensioning apparatus. For example, the tubular member may be a section of rigid pipe. The tubular member may be a single unitary structure, or may comprise a plurality of sub-units. The tubular is preferably of circular cross-section. The tubular section may, in principle be solid, but is more preferably hollow. During lowering, the tubular member is tensioned by the tensioning apparatus. In some embodiments of the invention, the tubular member may have the same diameter as the pipeline being lowered. This need not necessarily be so however, and in some other embodiments of the invention, the diameter of the tubular member and the pipeline may differ.

It will be appreciated that some positions (for example the tubulars being between the pipeline and the winch apparatus, and/or certain elements being upstream or downstream of the tensioning apparatus) are referred to with respect to the direction of the sealine (comprising the pipeline, the tubular member, the winch line etc). In some circumstances, this may not necessarily reflect their actual spatial positions.

The present invention is especially beneficial where the tensional load from the pipeline is greater than the capacity of the winch apparatus. The tensional load of the pipeline may be greater than the capacity of the tensioning apparatus. The load capacity is typically the maximum load that an apparatus is rated to safely handle.

In principle, the present invention may be applied to any A/R situation. For example, the method of the invention may be used for abandoning an undamaged pipeline in the event of poor weather. The method is of particular benefit however, in the case where the tensional load of the pipeline is greater than the tensional load on the pipeline during pipe laying (for example where the pipeline is a flooded pipeline that has suffered a wet buckle).

The tensional load of the pipeline at the start of the abandonment process is preferably more than 750 tonnes, more preferably more than 1000 tonnes, and may be 1500 tonnes or more. In principle, the present invention may be applicable to various pipe laying methods such as J-lay or S-lay, but more preferably the method is a method of abandoning a pipeline that has been laid using an S-lay method. Embodiments of the present invention may comprise the step of laying, and preferably S-laying, the pipeline before abandoning the pipeline. The method is preferably conducted in a water depth of less than 1500 m. The method may be conducted in a water depth of less than 1000 m.

At least 10%, more preferably at least 20%, and yet more preferably at least 25%, of the tensional load is taken by the winch apparatus. At least 10%, and more preferably at least 20% and yet more preferably at least 25%, of the tensional load is taken by the tensioning apparatus. The tensional load is preferably distributed substantially evenly between the winch apparatus and the tensioning apparatus.

The method may comprise the step of: (i) inserting a spacer member upstream of the end of the pipeline. The method may comprise the subsequent step of (ii) lowering the pipeline by the length of the spacer member. It will be appreciated that the spacer member need not necessarily be directly upstream of the end of the pipeline. For example, there may be a plurality of other spacer members located between the end of the pipeline and the spacer member being inserted.

The method may comprise the step of holding the pipeline, prior to lowering the pipeline with the winch apparatus and the tensioning apparatus. For example the method may comprise the step of temporarily holding the pipeline to allow a spacer member to be inserted upstream of the end of the pipeline. The pipeline is preferably held by clamping, for example with a micro-indentation clamp. Initially in the abandonment method, the pipeline itself may be held. As the pipeline has been lowered further towards the seabed, a tubular, member (e.g. a spacer member) upstream of the actual pipeline may be held. In both these scenarios, it will be appreciated that the pipeline is held (albeit directly or indirectly).

The method may further comprise repeatedly performing steps (i) to (ii) with a plurality of spacer members. In this manner, the pipeline may be gradually lowered towards the seabed. Steps (i) to (ii) may be repeated until the tensional load of the pipeline and of any spacer members upstream of the pipeline, is reduced to below the capacity of the winch apparatus. The steps may be repeated until the pipeline is lowered to the seabed.

The spacer member may be any member that withstands the tensional load of the pipeline and adds length above the pipeline such that it is lowered towards the seabed. The spacer member preferably generates a tensional load that is less than the tensioned load of a corresponding length of flooded pipeline. A spacer member may be flexible, for example the spacer member may comprise a cable, but the spacer member is more preferably a pipe-shaped member. For example, the spacer member may be a dummy pipe or may be the project pipe itself. Each spacer member is preferably not in fluid communication with adjacent spacer members. The spacer member adjoining the end of the pipeline is preferably not in fluid communication with the pipeline. The tubular member received in the tensioning apparatus may comprise (including for the avoidance of doubt, being in the form of) a spacer member.

The spacer member is preferably lowered by simultaneous use of the winch apparatus and the tensioning apparatus. The step of inserting the spacer member preferably comprises the step of releasably coupling the winch apparatus to the spacer member with a connector. The connector is preferably on the end of a winch line extending from the winch apparatus (it will be appreciated that the connector need not be directly attached to the winch line and there may be intermediate elements between the connector and the end of the winch line itself). The connector preferably enables the winch apparatus to be repeatedly coupled and de-coupled to/from the spacer members. Such an arrangement may enable the spacer members to be quickly inserted above the pipeline and may enable the pipeline to be quickly lowered, because the spacer members are able to be quickly coupled/decoupled from the winch apparatus.

The step of inserting the spacer members may comprise the step of coupling together the spacer member to an adjacent spacer member. The spacers may be permanently coupled together (for example welded together). In other embodiments, the spacer members may be releasably coupled together. The step of inserting a spacer member may comprise the step of releasably coupling the spacer member to an adjacent spacer member. This may allow the spacer members to be de-coupled after the pipeline has been abandoned, and reused at a later date. The releasable connection between the spacer members is preferably a mechanical connection. In some embodiments of the invention, the spacer members may be inserted upstream of the tensioning apparatus. The spacer members may be inserted such that the tubular member received in the tensioning apparatus comprises at least one spacer member. The tubular member may comprise a spacer member that had previously been inserted upstream of the tensioning apparatus and that had moved into the tensioning apparatus as the pipeline was lowered towards the seabed. The tubular member may comprise a plurality of spacer members. As the pipeline is lowered towards the seabed, the tubular member may comprise different spacer members. For example as one spacer member exits the tensioning apparatus, another spacer member may enter the tensioning apparatus. The spacer members are preferably receivable in the tensioning apparatus. For example, the spacer members may be dummy pipes of the same diameter as the pipes of the pipeline (previously lowered by the tensioning apparatus during pipeline laying).

In other embodiments of the invention, the spacer members may be inserted downstream of the tensioning apparatus. In these embodiments, the tubular member may comprise a structure that remains unmodified as the pipeline is lowered towards the seabed. For example, the tubular member may comprise a tubular structure that is reciprocated within the tensioning apparatus as the spacer members are inserted downstream and the pipeline is lowered. In embodiments in which the winch apparatus is releasably coupled to the spacer member with a connector, the connector may be on one end of the tubular member. The connector may be on an end of the tubular member that extends downstream of the tensioning apparatus. The tensioning apparatus may comprise a tensioner and preferably comprises a plurality of tensioners. The winch apparatus may comprise a plurality of winches, but more preferably comprises only one winch (additional winches being unnecessary because the tensional load is distributed between the winch and tensioning arrangement).

The method may comprise the step of attaching an abandon/recovery (A/R) head to the end of the pipeline. The A/R head may be connectable to a spacer member. The A/R head is preferably releasably connectable to the spacer member such that the spacer member can be detached from the A/R head when the pipe has been abandoned. The spacer member may be disconnected from the A/R head remotely (for example by actuating a releasable connector), or may be directly disconnected using an ROV or alike.

A flooded pipeline is typically mended and purged of water once it has been abandoned. Thus, to recover the pipeline, the A/R winch may be used on its own (since the tensional load of the pipeline as it is raised will be correspondingly decreased). Nevertheless, in some circumstances it may be desirable to recover, or part recover, a heavy (e.g. flooded) pipeline. Thus, according to a second aspect of the invention, there is provided a method of recovering a pipeline from an offshore vessel, wherein the method comprises the steps of: providing a tubular member between a winch and the end of the pipeline being recovered, the tubular member being received in a tensioning apparatus, and raising the pipeline with the winch and the tensioning apparatus, the tensional load of the pipeline being distributed between the tensioning apparatus and the winch during raising. The method of recovering the pipeline may be substantially the same as the method of abandoning the pipeline, except in reverse. Features described with reference to the method of abandoning the pipeline are equally applicable to the method of recovering the pipeline.

According to yet another aspect of the invention, there is provided a vessel comprising an A/R system for carrying out the method of abandoning and/or recovering a pipeline described herein according to the first and second aspects of the invention. The A/R system may comprise a winch apparatus, a tensioning apparatus and a tubular member connected between the winch apparatus and the end of the pipeline. The tubular member may be received in the tensioning apparatus such that during abandonment/recovery the tensional load of a pipeline may be distributed between the tensioning apparatus and the winch apparatus. The system may comprise a plurality of spacer members for inserting above the end of the pipeline such that the pipeline may be lowered towards the seabed. The A/R system may further comprise means for holding the pipeline, for example a clamp.

The system may comprise a connector member for releasably coupling the winch apparatus to a spacer member. The connector member may comprise a clamping structure for releasably clamping an end of the spacer member. The clamping structure may comprise a hinged jaw arranged to releasably clamp an end of the spacer member. The connector member may comprise a first end for connecting to the spacer member, and a second end for connecting to the winch line from the winch apparatus. The second end may be arranged to directly connect to the winch line; for example the second end may comprise a padeye for receiving a hook on the winch line. The connector member may be receivable in the tensioning apparatus. For example, the connector member may be an elongate tubular structure. The tubular member may comprise, or may be, the connector member.

According to yet another aspect of the invention there is provided a connector member for releasably coupling a winch apparatus to a spacer member. The connector member may comprise a tubular structure. The tubular structure may have a first end comprising a hinged jaw arranged to releasably clamp an end of the spacer member. The connector member and spacer member may be the same diameter.

According to another aspect of the invention there is provided a method of abandoning a pipeline from an offshore vessel comprising repeating the steps of:

(i) inserting a spacer member above the end of the pipeline,
(ii) coupling a winch apparatus to the spacer member with a connector,
(iii) lowering the pipeline by the length of the spacer member,
(iv) releasing the connector to de-couple the winch from the space member,
(v) retracting the connector to allow another spacer member to be inserted above the end of the pipeline. The vessel may include a tensioning apparatus for applying tension to the pipeline during pipe laying operation and the method may comprise, during step (iii), using both the winch apparatus and the tensioning apparatus to apply tension to the pipeline. A tubular member is preferably received in the tensioning apparatus.

According to yet another aspect of the invention, there is provided a kit of parts for use in the above-described methods and/or apparatus. The kit may comprise a plurality of spacer members; a tubular member; and a connector for releasably coupling a winch to the spacer member.

Any features described with reference to one aspect of the invention are equally applicable to any other aspect of the invention, and vice versa.

DESCRIPTION OF THE DRAWINGS

Various embodiments of the invention will now be described, by way of example only, with reference to the accompanying schematic drawings of which:

FIG. 4 shows a connector member used in the first embodiment of the invention;

FIG. 5 shows a spacer member used in the first embodiment of the invention;

FIGS. 7a to 7c show a connection between the A/R head and the first spacer member in the first embodiment of the invention;

FIG. 22 shows a connection between the A/R head and the first spacer member in the second embodiment of the invention; and FIGS. 23a and 23b show the connection between the connector member and a spacer member in the second embodiment of the invention.

DETAILED DESCRIPTION

FIGS. 1 to 15 show a pipe laying vessel 1 according to a first embodiment of the invention and close-up views of elements on that vessel.

Figure 1:
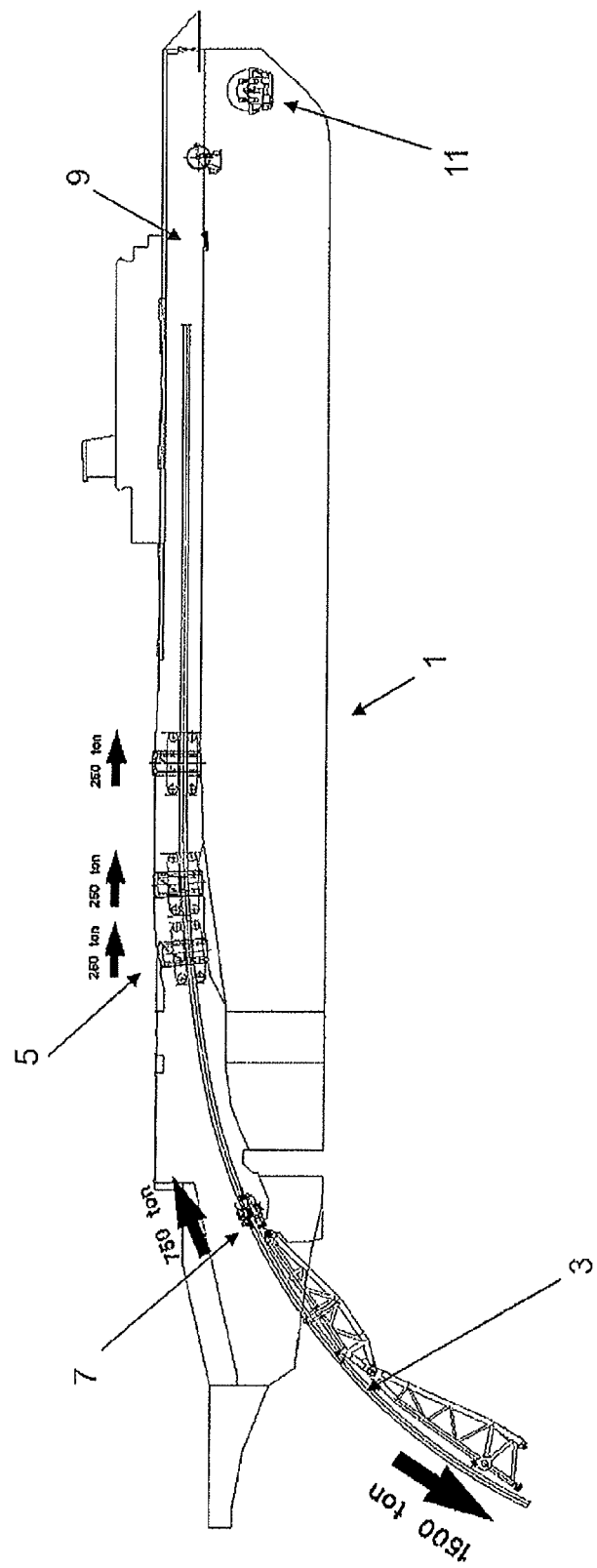
FIGS. 1 to 3, 6 and 9 to 15 show a vessel abandoning a pipeline in a method according to a first embodiment of the invention.

Referring first to FIG. 1, the vessel 1 has been laying a pipeline 3 is relatively shallow water (in an S-lay configuration). The method of S-laying a pipeline and the parts of the apparatus for laying the pipeline 3 are known and are not described in detail herein; in brief, the pipeline 3 is held in a series of three tensioners 5 and lowered towards the seabed as successive pipe sections are added to the pipeline in the line up 9. During normal S-lay operations, the tensional load on the pipeline is 750 tons. This tensional load is accommodated by the three tensioners 5, each tensioner taking a tensional load of approximately 250 tons.

The vessel in the first embodiment of the invention comprises a microindentation clamp 7 and an A/R winch 11 for use during abandonment/recovery (A/R) of the pipeline. A/R may, for example, be required during bad weather or if the pipeline becomes damaged and is flooded. In the latter situation, the tensional load of the pipeline is significantly increased and the A/R system needs to be capable of withstanding this high tensional load.

FIG. 1 shows the vessel 1 shortly after the pipeline has suffered a wet-buckle, causing the pipeline 3 to flood. The tensional load of the pipeline 3 has increased to 1500 tons. This load exceeds the capacity of the tensioners 5, so the pipeline 3 is held in position by the combination of the tensioners 5 and the microindentation clamp 7. Each of these apparatus take 750 tons of the load (see the large arrows in FIG. 1).

The pipeline 3 must now be abandoned until the wet buckle can be fixed. Various stages of the A/R method according to an embodiment of the present invention will now be described with reference to FIGS. 2 to 15.

Figure 2:
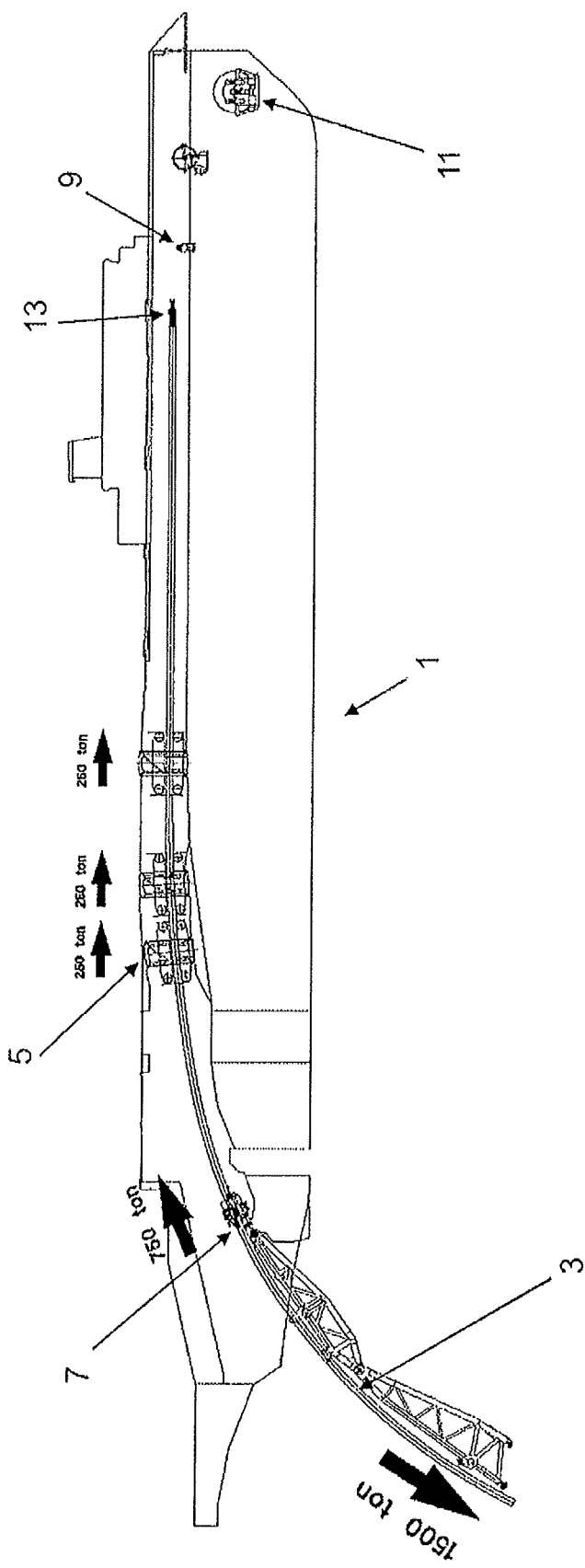

Firstly, the section of pipeline ahead of the line up 9 is cut and an A/R head 13 is mounted on the end of the pipeline (see FIG. 2).

Figure 3:
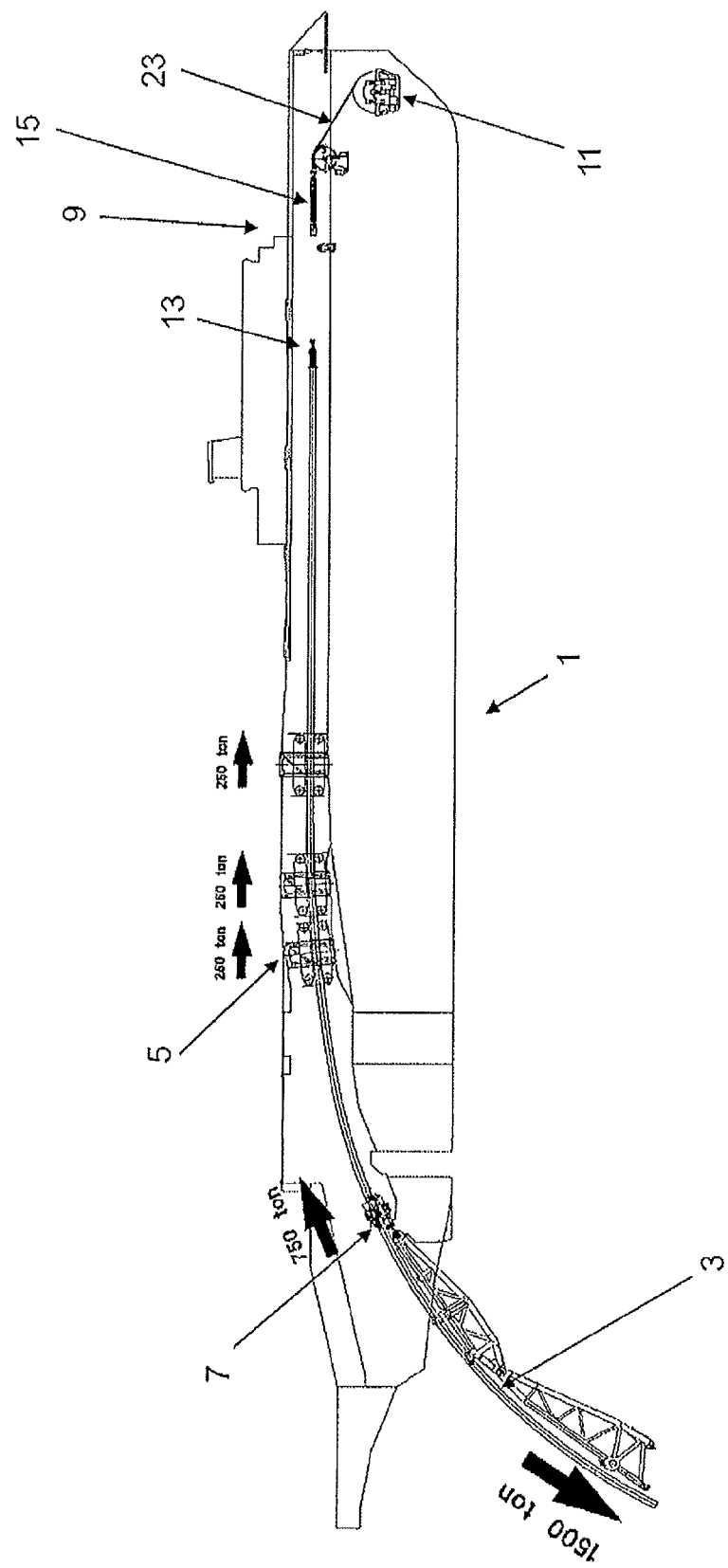

Referring next to FIG. 3, a connector member 15 is moved into position adjacent to the line up 9, and then lifted into the line up 9. A padeye 21 (see FIG. 4) is attached to the winch line 23. In preparation for the insertion of dummy pipes, the connector member is positioned in a retracted position close to the winch 11. The connector member 15 is shown in detail in FIG. 4 and comprises an elongate tubular body 17 having, at one end, releasable connector 19 and at the other end the padeye 21 for connection to the line 23 of the winch 11. The length of the connector member is 12.5 m and it has a diameter of 24 inches. The operation of the releasable connector 19 is shown in more detail in FIGS. 8a to 8b and is described with reference to that Figure in due course.

Figure 6:
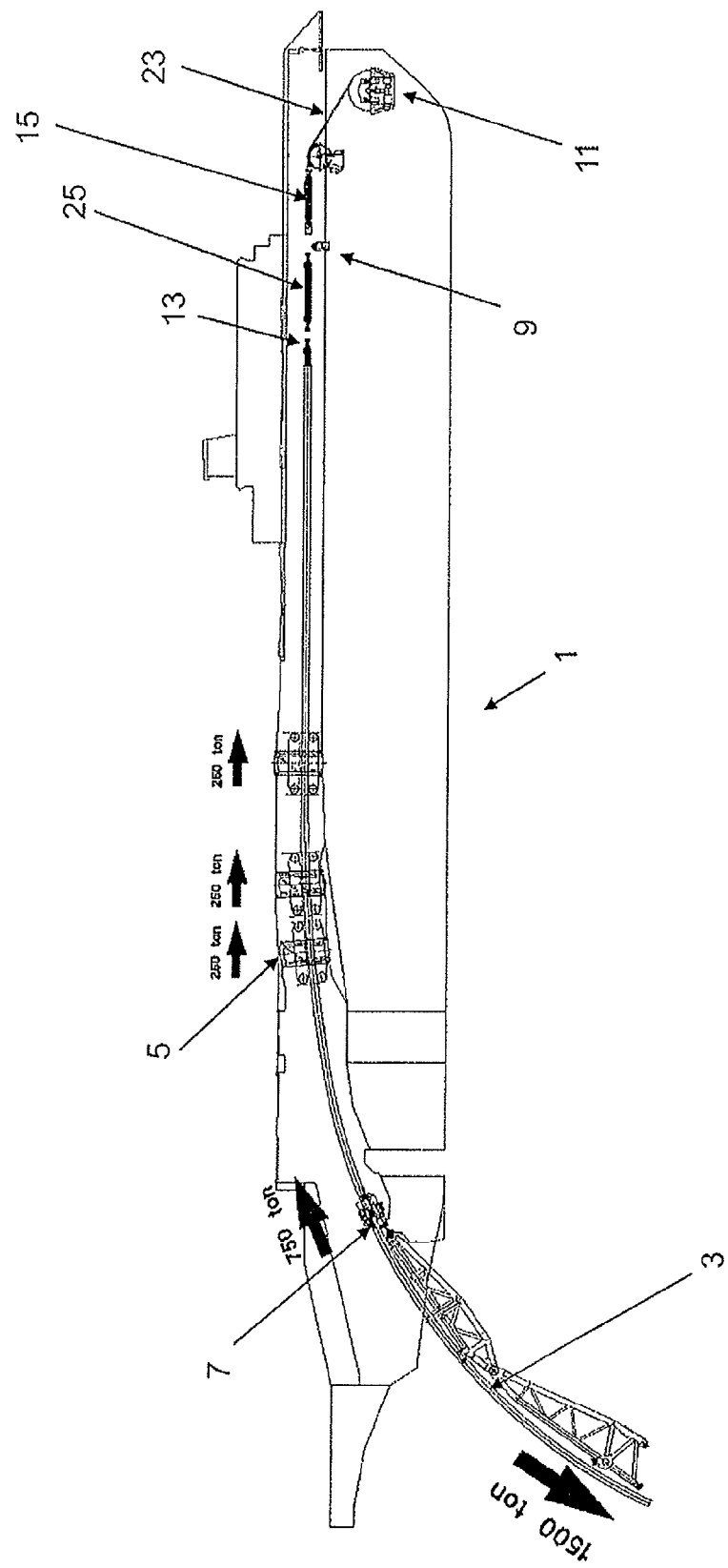

A dummy pipe 25 is transported to, and then installed in, the line up 9 (FIG. 6). The dummy pipe is inserted above the end of the pipeline 3 and between the pipeline and the winch 11. The dummy pipe 25 is shown in detail FIG. 5. The dummy pipe is the same diameter (24 inches) as the pipeline 3 and has a length of 18 m. At both ends of the dummy pipe 25, there is provided a connection head 27 which is substantially identical in shape to the A/R head 13.

Figure 7A:
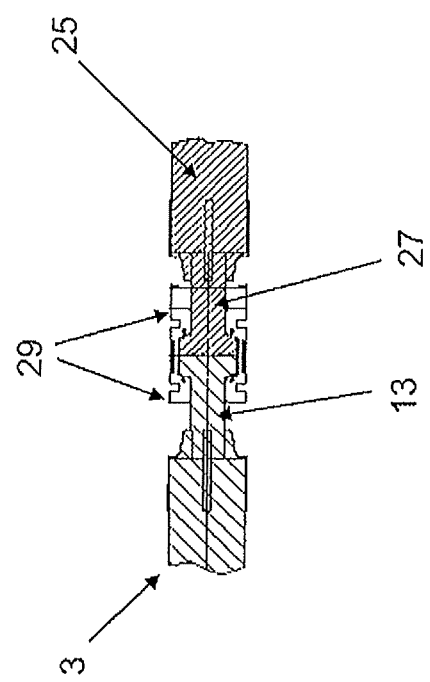
Figure 7B:
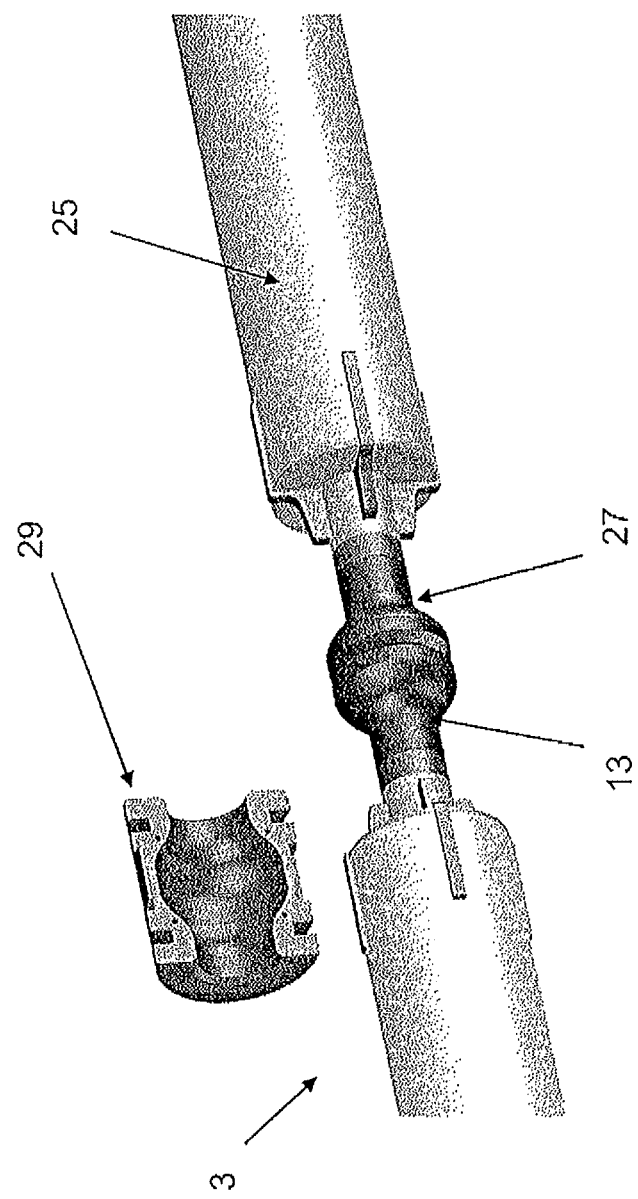

The next step is for the dummy pipe 25 to be connected to the A/R head 13 on the end of the pipe line 3. This connection is shown in FIGS. 7a to 7c. The connection comprises two metal half shells 29 (only one being shown in FIGS. 7a and 7b) enclosing the A/R 13 head and the end of the dummy pipe 27. Each half shell 29 has a semi-circular cylindrical outer surface and a scalloped interior surface that is complementary with the shape of the A/R head and the end of the dummy pipe. To connect the A/R head and pipeline, the half shells are placed either side of the A/R head and end bolted together with bolts 28. Such an arrangement holds the elements together whilst also enabling the connection to be dismantled and re-used as and when the A/R process is complete.

Figure 8A:
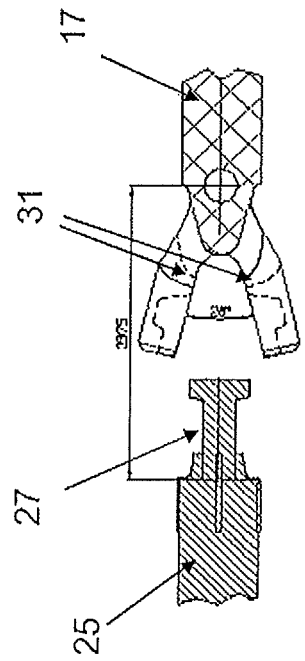
FIGS. 8a to 8d show the connection between the connector member and a spacer member in the first embodiment of the invention.
Figure 8B:
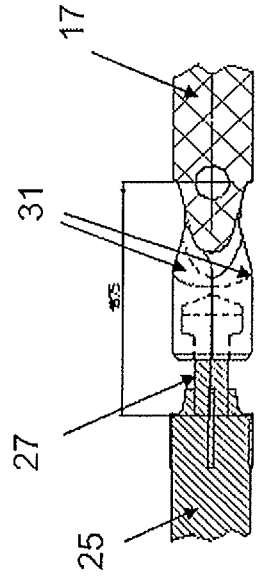
Figure 8C:
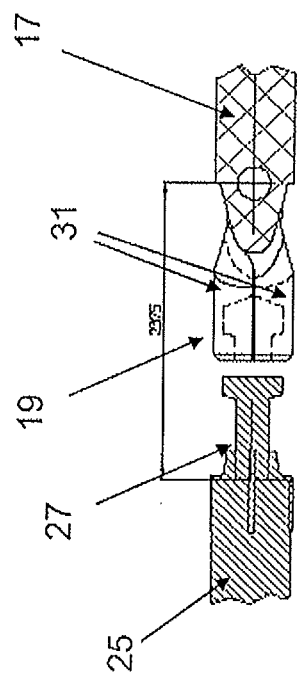
Figure 8D:
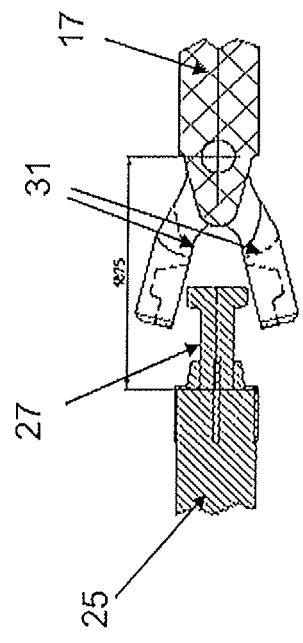

A connection is then made between the connector member 15 and the other end of the dummy pipe 25. As shown in FIG. 8a, the connector 19 on the end of the elongate tubular body 17 of the connector member 15, is positioned adjacent to the end 27 of the dummy pipe 25. Hinged jaws 31 are then actuated using hydraulics such that they are opened to 28 degrees (FIG. 8b). The connector member 15 is then moved forwards such that the open jaws 31 envelop the end 27 of the dummy pipe 25 (FIG. 8c). Finally, the jaws 31 are closed over the bulbous head 27 on the end of the dummy pipe 25. The interior surface of the jaws 31 is shaped to receive the head 27 in a close fit. The connection is such that the tensile loads in the dummy pipe 25, and hence the pipeline 3, can be transferred to the connector member 15, and hence the winch 11.

Figure 9:
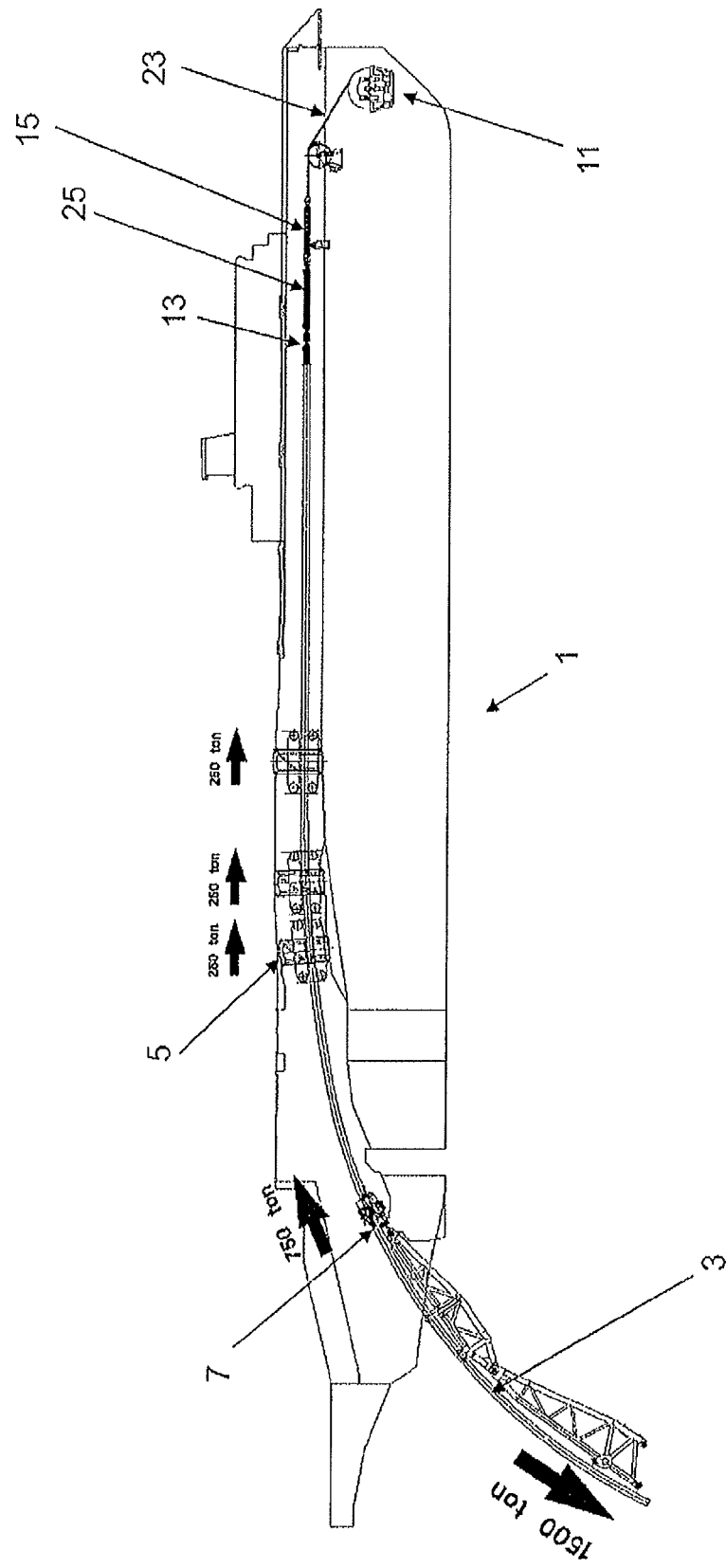
Figure 10:
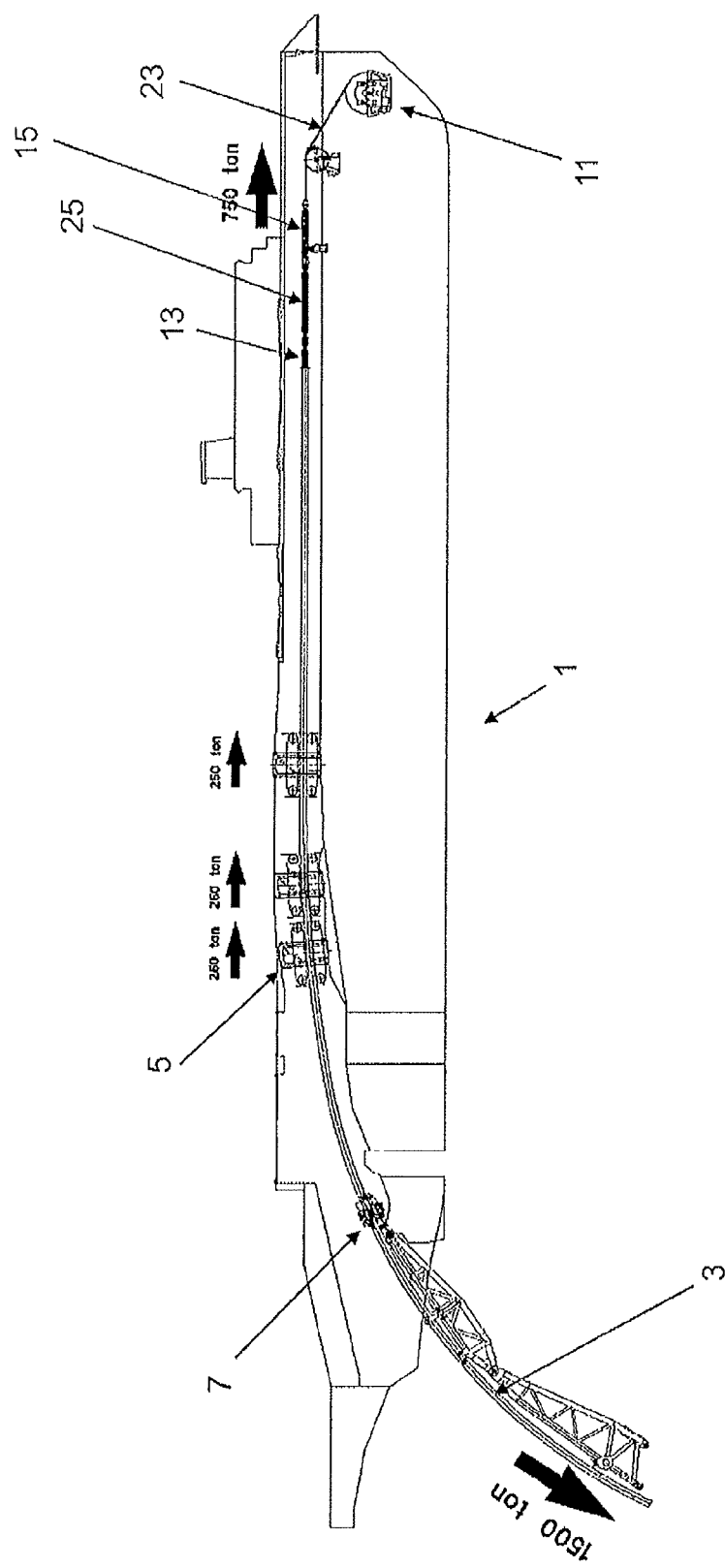
Figure 11:
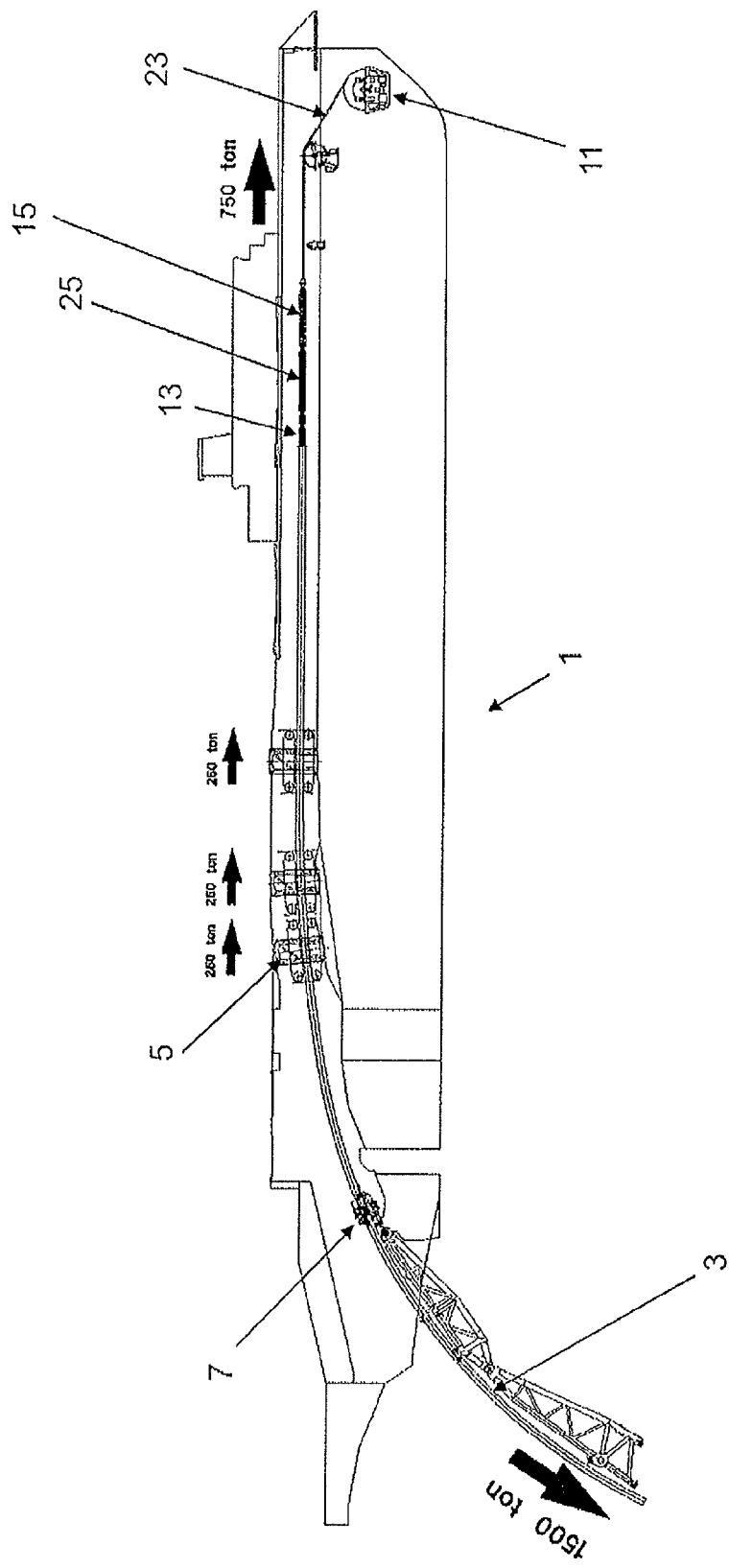

The A/R system is now ready to lower the pipeline 3 and this process is shown in FIGS. 9 to 11; the microindentation clamp is released such that the 1500 ton tensional load is taken by the tensioners (3×250 tons) and the winch (750 tons)—see FIG. 10. As a result of a tubular member (in this case the pipeline itself) being received in the tensioners 5, some of the tensional load can be taken by the tensioners 5. In addition, the pipeline 3 is coupled to the winch 11 and the winch 11 can therefore also take some of the load. This mitigates the need more multiple and/or high capacity winch apparatus as may be used in conventional arrangements.

The tensioners 5 and the winch 11 both allow the pipeline 3 to be moved, whilst maintaining the required tesile load on the pipeline. Accordingly, the winch line 23 is paid out until the pipeline has been lowered by 18 m (i.e. the length of the dummy pipe 25). This position is shown in FIG. 11. At this point, the microindentation clamp 7 is reapplied, such that the tensional load is again shared between the clamp 7 and the tensioners 5. This allows the connector on the connector member 15 to be detached from the end of the dummy pipe 25, and for the connector member 15 to be withdrawn back to a position adjacent to the winch 11.

Figure 12:
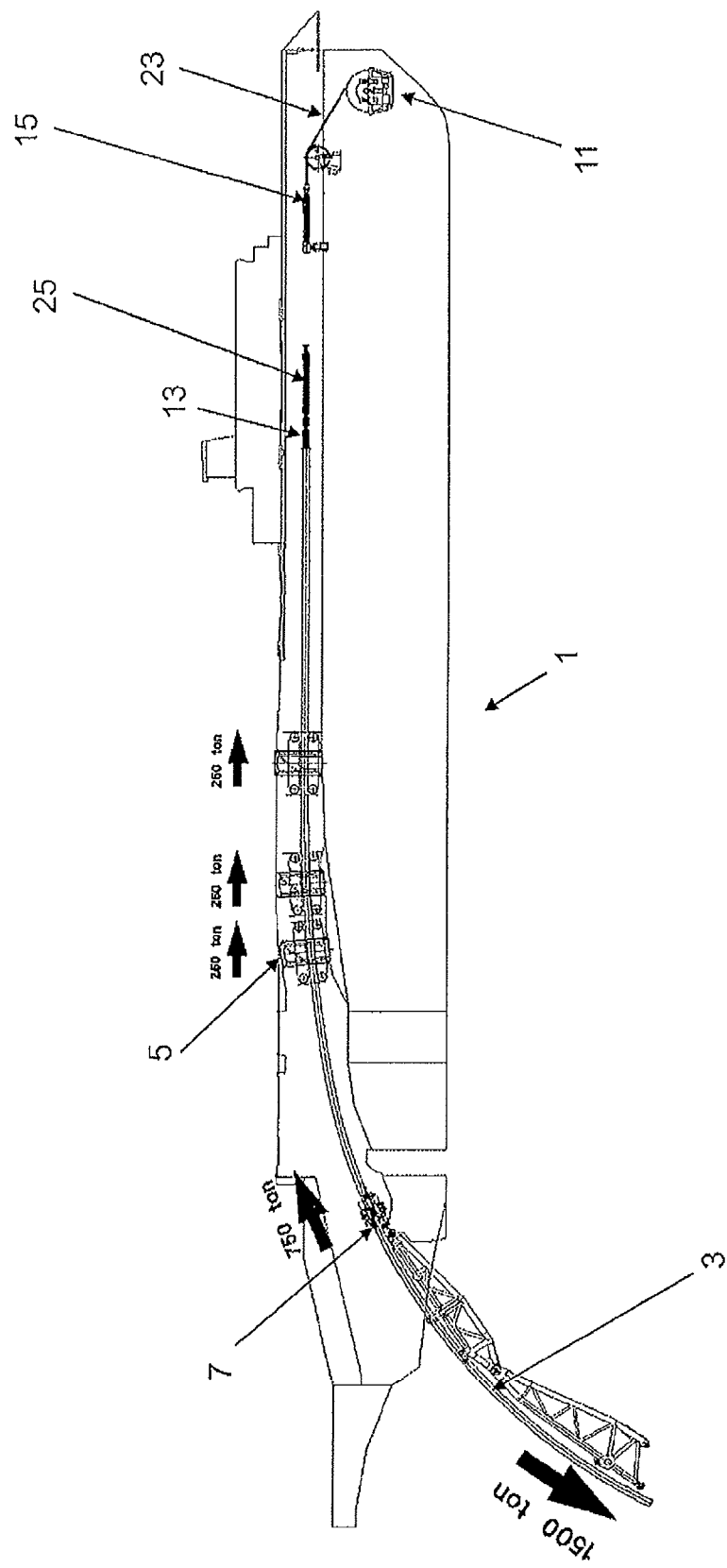
Figure 13:
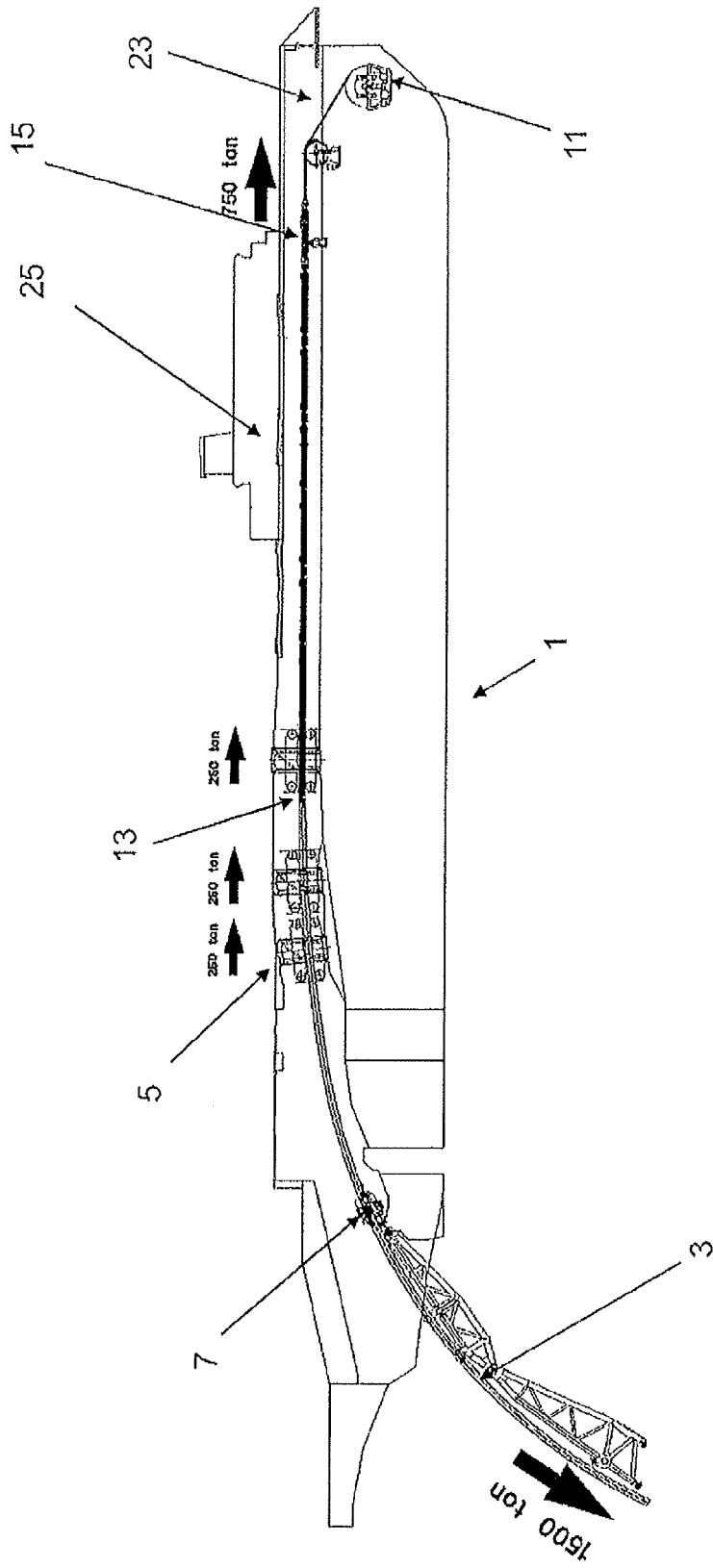

Referring to FIG. 12, the winch line is drawn back to open the gap between the connector member 15 and the dummy pipe 25. A second dummy pipe is then inserted into the line up, above the end of the pipe line and downstream of the winch. The steps above described with reference to FIGS. 1 to 11 are then repeated, namely: the dummy pipe 25 connects to the end of the adjacent dummy pipe 25; the connector 19 couples to the other end of the dummy pipe 25; the load is transferred from the clamp 7 and tensioners 5 to the tensioners 5 and the winch 11; and the pipeline is lowered by the length of a dummy pipe 25.

By repeating this process many times, with successive dummy pipes, the pipeline is gradually lowered towards the seabed. As more dummy pipes are added, the pipeline that was originally received in the tensioners is moved downstream and the dummy pipes move into the tensioners (see FIG. 13). As the process continues, only dummy pipes are received in the tensioners. It will be appreciated that by providing tubular members (in this case dummy pipes for the majority of the process) in the tensioners, the load can be distributed between the tensioners and the winch.

Figure 14:
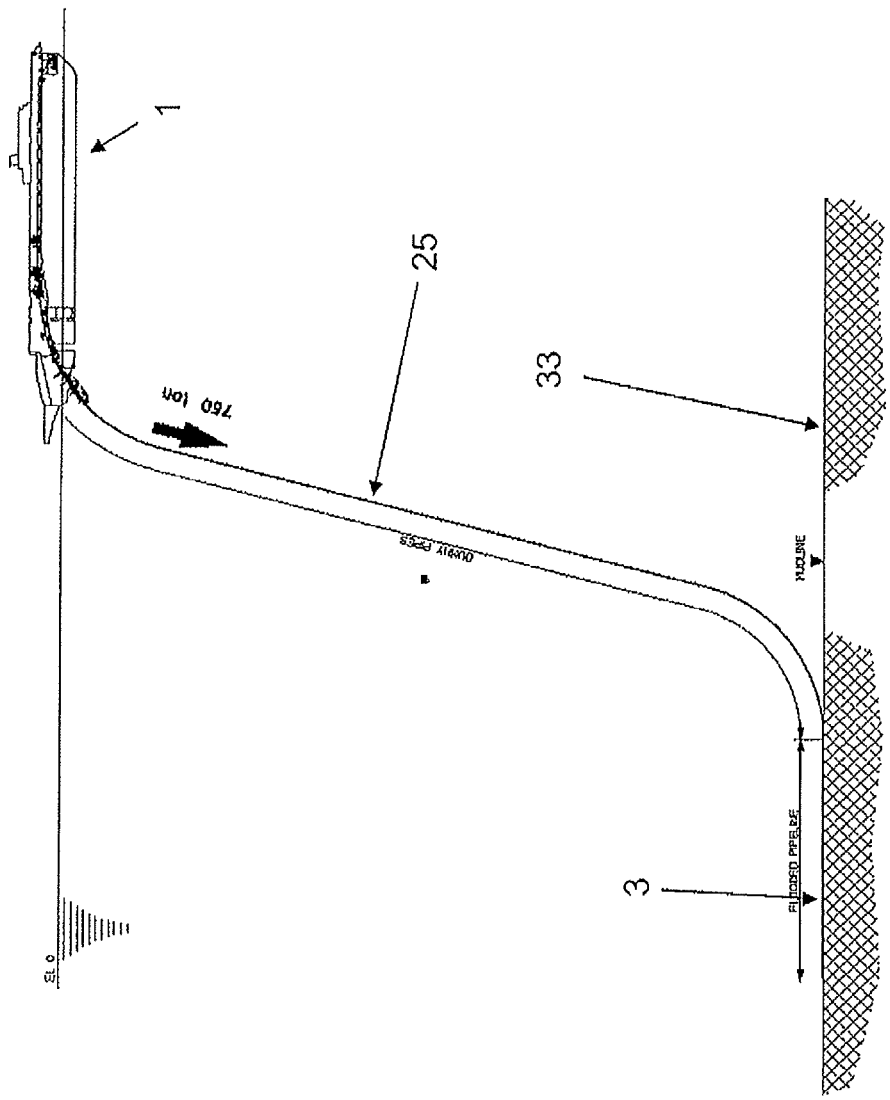
Figure 15:
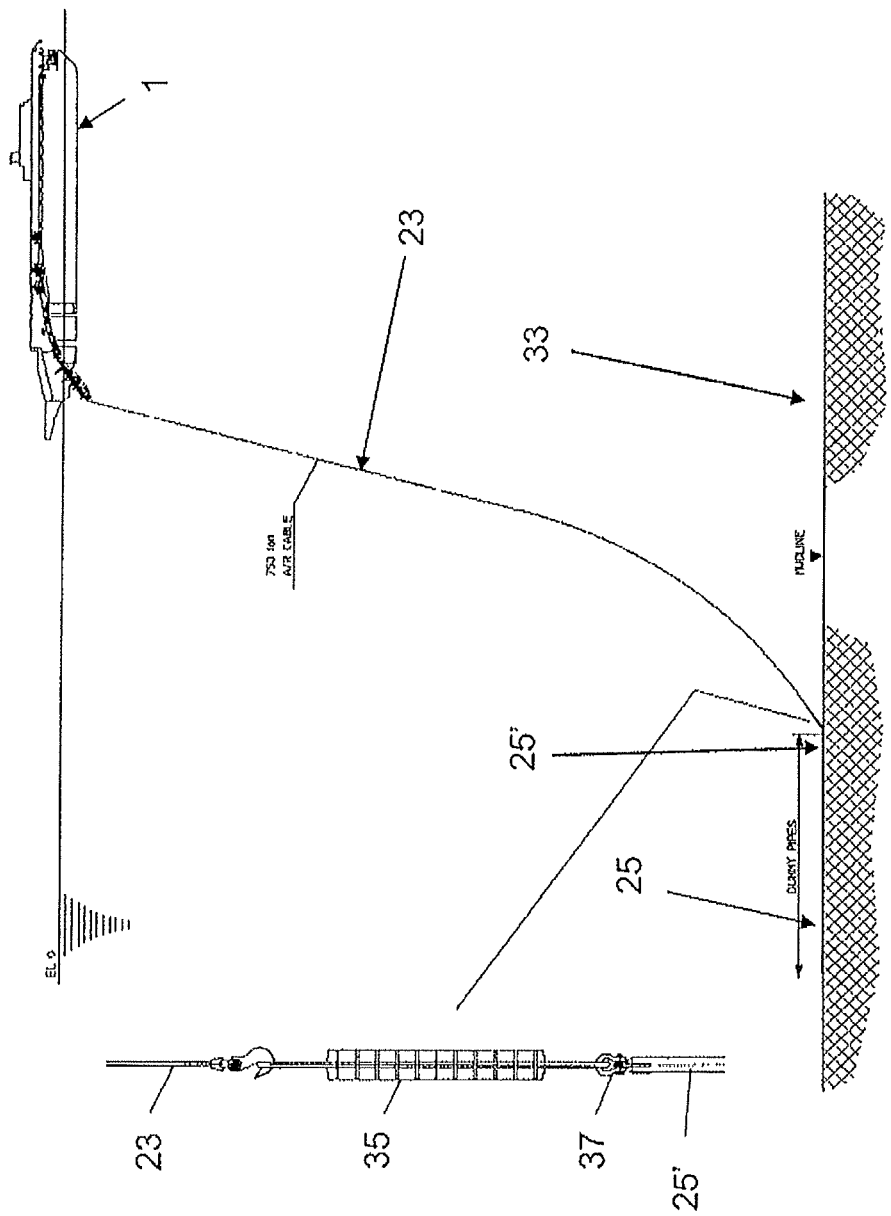

FIG. 14 shows when the flooded pipeline 3 has reached the seabed 33. At this stage, the tensional load on the tensioners 5 and the winch 11 is generated by the length of dummy pipes 25 extending to the seabed 33. In the first embodiment, this load is 750 tons (i.e. less than the maximum capacity of the winch). Thus, once the tensional load has been reduced to this value, the A/R process can continue with only the A/R winch being used. As shown in FIG. 15, the A/R cable 23 is attached to the final dummy pipe 25' (via an A/R grommet 35 and shackle 37) and lowered to the seabed 33 for later recovery once the wet buckle has been repaired.

FIGS. 16 to 25 show a vessel and method according to a second embodiment of the invention. The second embodiment of the invention is substantially identical to the first embodiment except for the differences described below. When describing elements that are equivalent to those same elements in the first embodiment, the same reference numerals have been used, but with the prefix '1' or '10' added as appropriate.

Figure 16:
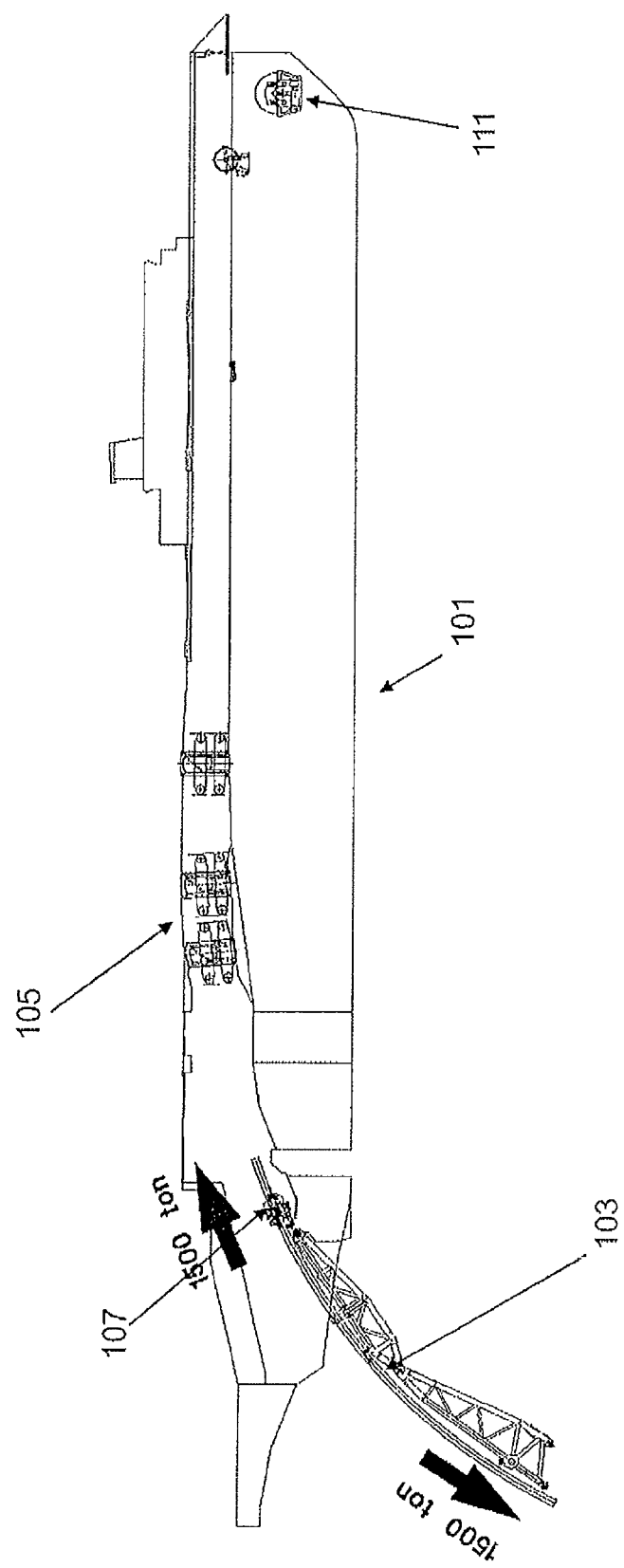
FIGS. 16 to 18, 20, 21 and 24 to 27 show a vessel abandoning a pipeline in a method according to a second embodiment of the invention.
Figure 17:
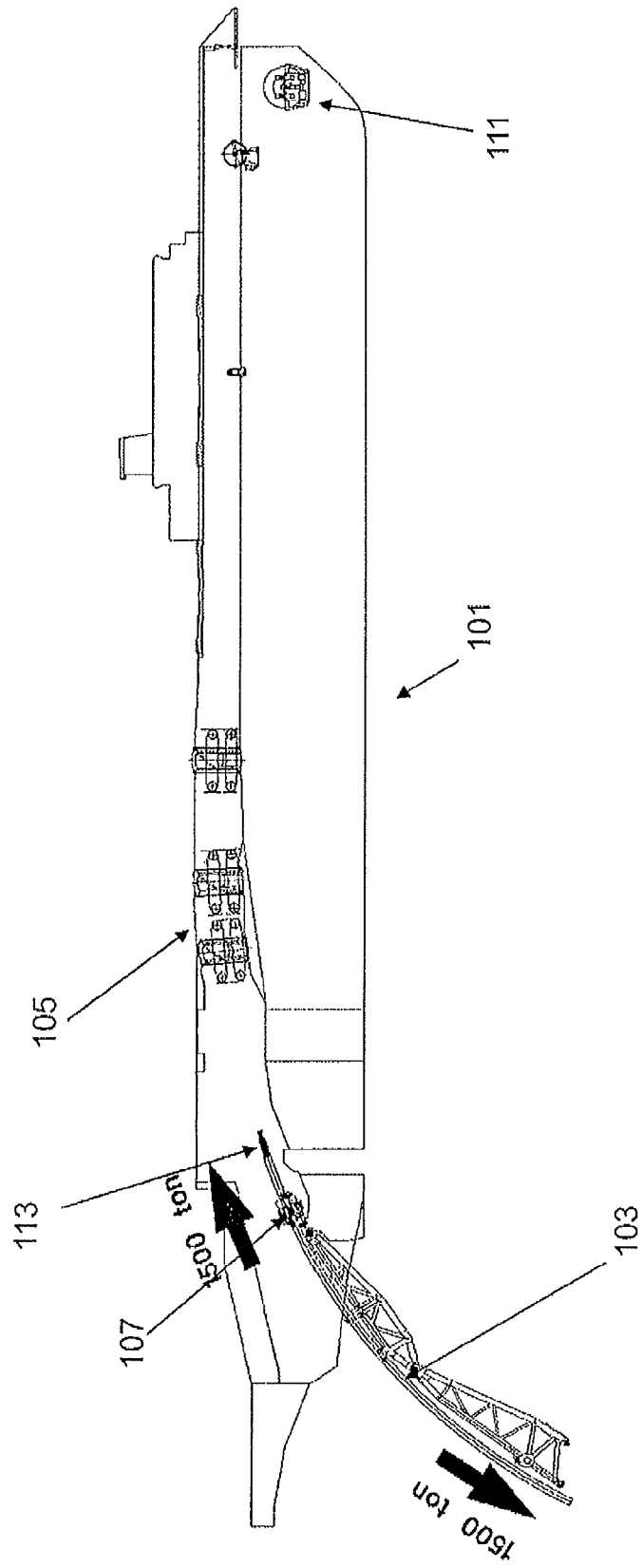

In the second embodiment, the microindentation clamp 107 has a capacity of 1500 tons, such that when the pipeline 103 becomes flooded, the clamp 107 alone can hold the tensional load of the pipeline 103. FIG. 16 shows the vessel in this situation, shortly after a wet buckle has occurred, and once the remaining part of the pipeline, upstream of the clamp, is dissembled and removed from the line up. Referring to FIG. 17 an A/R head 113 is attached to the end of the pipeline 103 adjacent to the clamp 107.

Figure 18:
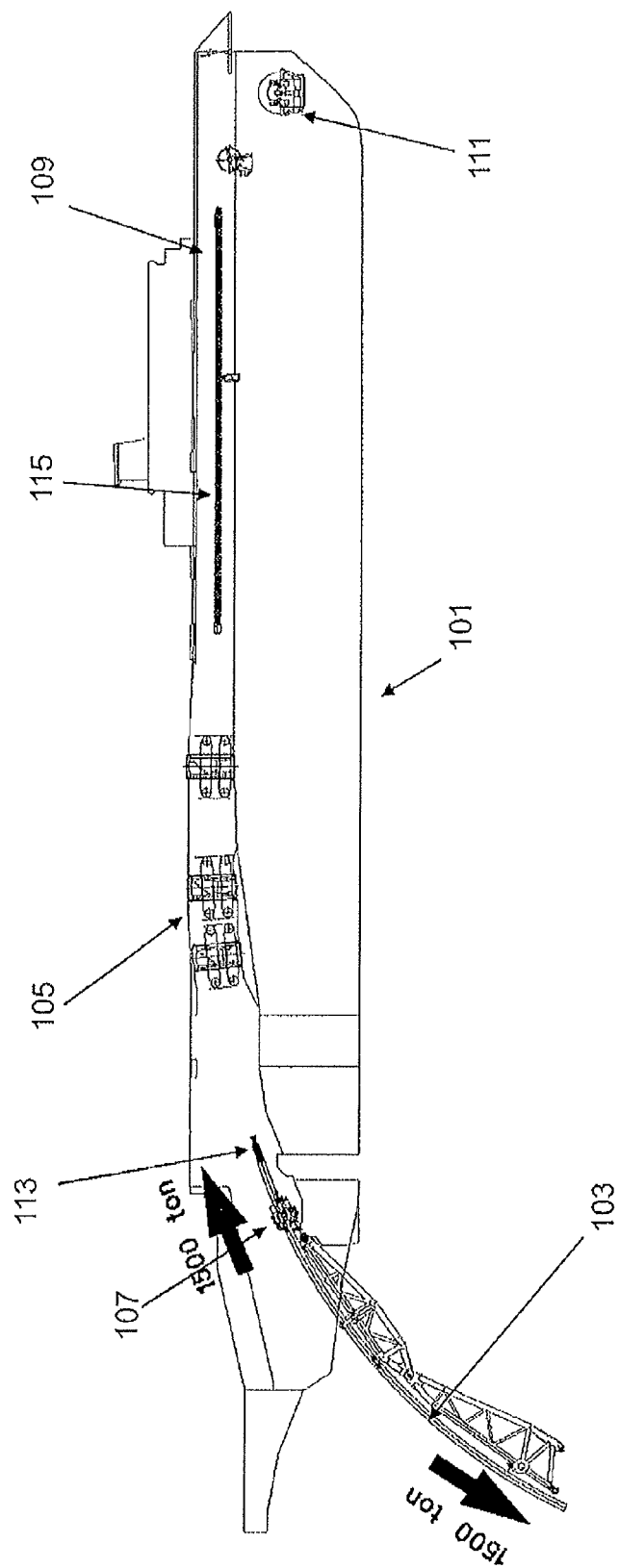
Figure 19:
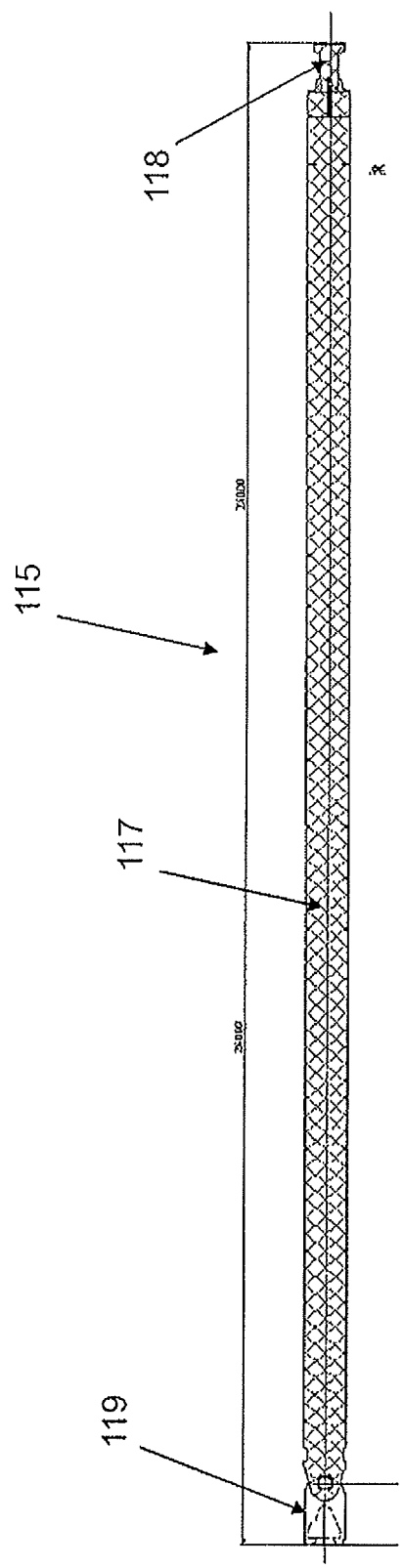
FIG. 19 shows a connector member used in the second embodiment of the invention.
Figure 20:
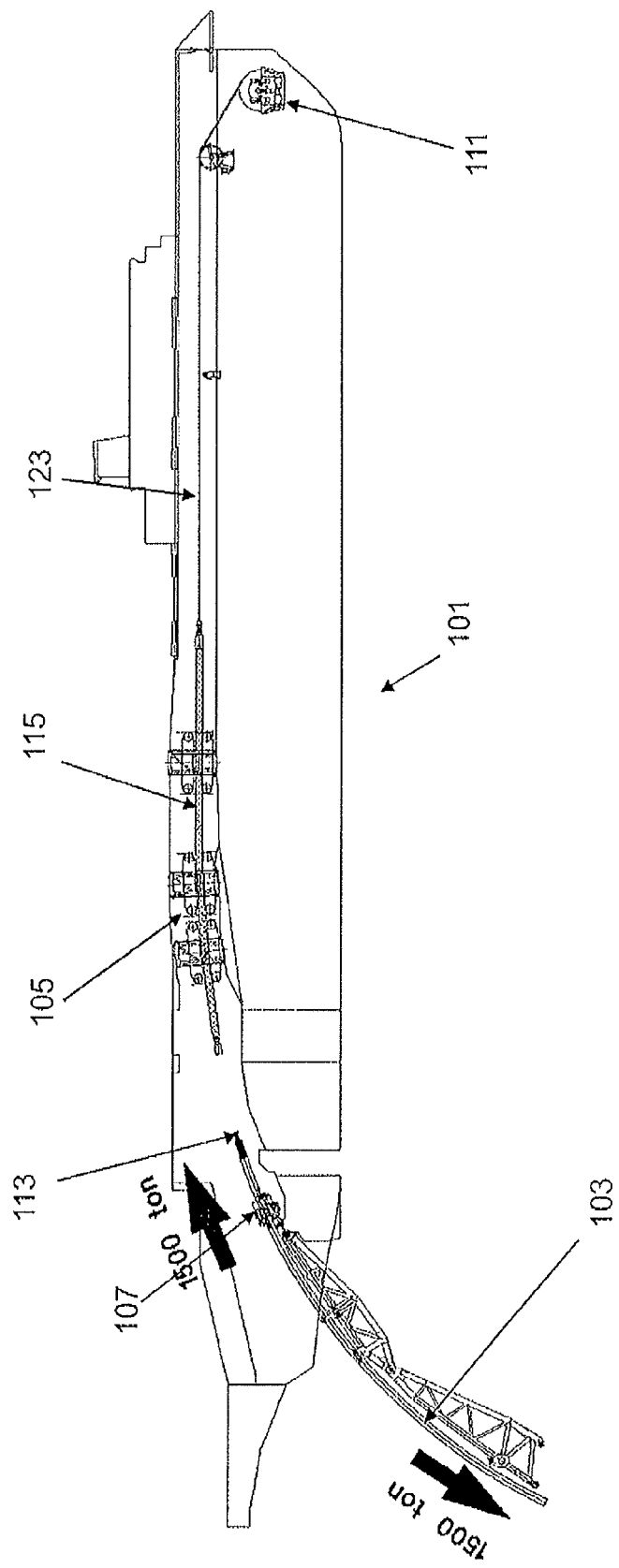
Figure 21:
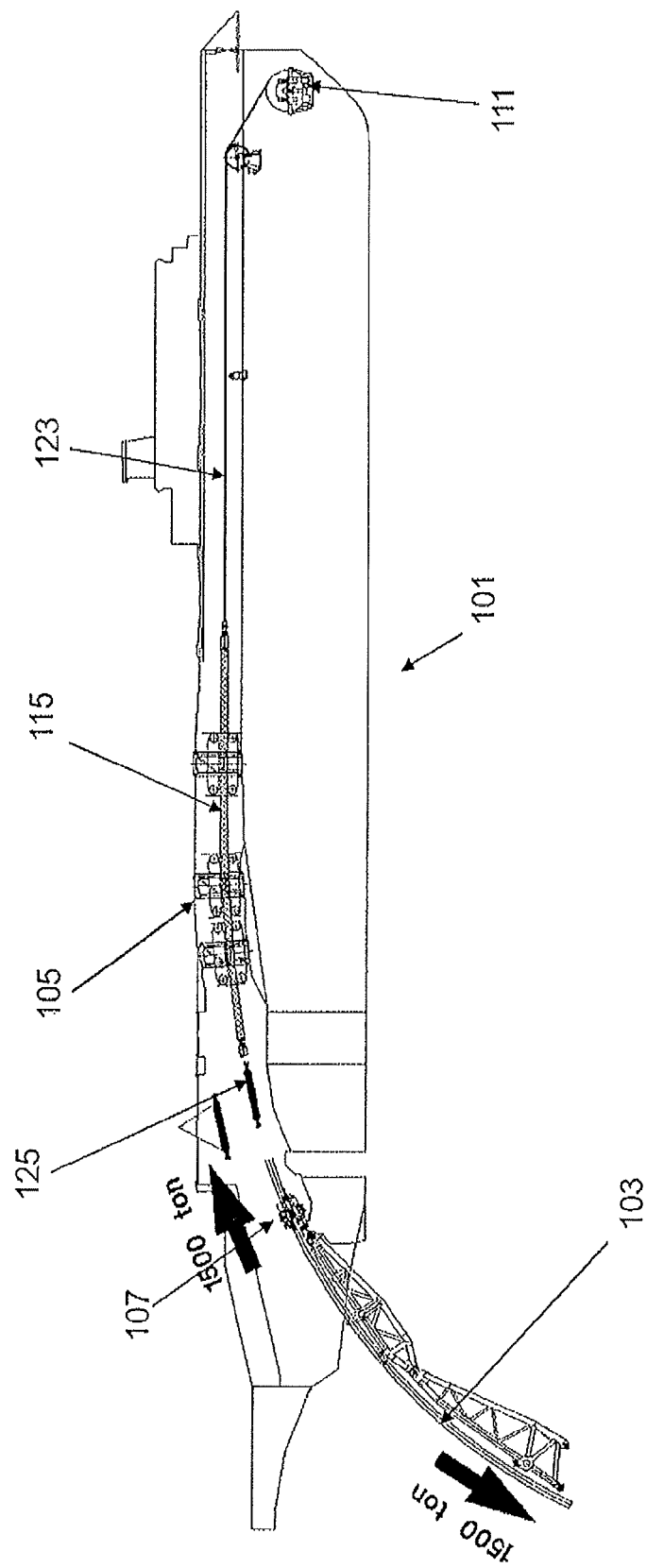

In the next step, shown in FIG. 18, a connector member 115 is installed in the line up 109. The connector member 115 is shown in detail in FIG. 19, and is substantially identical to that in the first embodiment, except that it is significantly longer (24 m exceeding the distance over which the tensioners are positioned) and has a diameter of 36 inches. As shown in FIG. 20 whilst the clamp holds the pipeline, the connector member is shifted forward on the line up. The firing line on the vessel 101 includes a series of rollers (not shown) which allow the connector member 115 to be moved forward until the connector 119 on the end of the connector member 115 is close to, but spaced apart from the A/R head 113 on the end of the pipeline. Next (FIGS. 21 and 22) a dummy pipe 125 is inserted above (i.e. upstream of) the end of the pipeline 103. The dummy pipe 125 in the second embodiment is similar to that in the first embodiment in that it is pipe shaped and has two bulbous attachment heads at either end. However, in the second embodiment the dummy pipes 125 are not received in the tensioners (as will be apparent from the subsequent description); there is therefore no requirement for the dummy pipes 125 to have a particular shape or size, so long as they can support the pipeline tensional load and act as spacers on top of the pipeline. For example, the dummy pipes 125 could, in principle be cables (if the cable were of sufficient strength to hold the 1500 ton load). The second embodiment of the invention uses a microindentation collar clamp. Thus, the collars of the dummy pipes 125 are of the correct diameter to be received and held in the collar clamp 107.

The connection between the dummy pipe and the A/R head is substantially identical to that in the first embodiment, namely the connection comprises a detachable, and reusable, two-part enclosure that surrounds the A/R head and the end of the dummy pipe. This connection is shown in FIG. 22

The jaws 131 of the connector 119 are then opened and moved so as to clasp the bulbous head on the end of the dummy pipe 125, as shown in FIGS. 23a to 23b. The connection is such that the tensile loads in the dummy pipe 125, and hence the pipeline, can be transferred to the connector member 115, and hence the winch 111.

Figure 24:
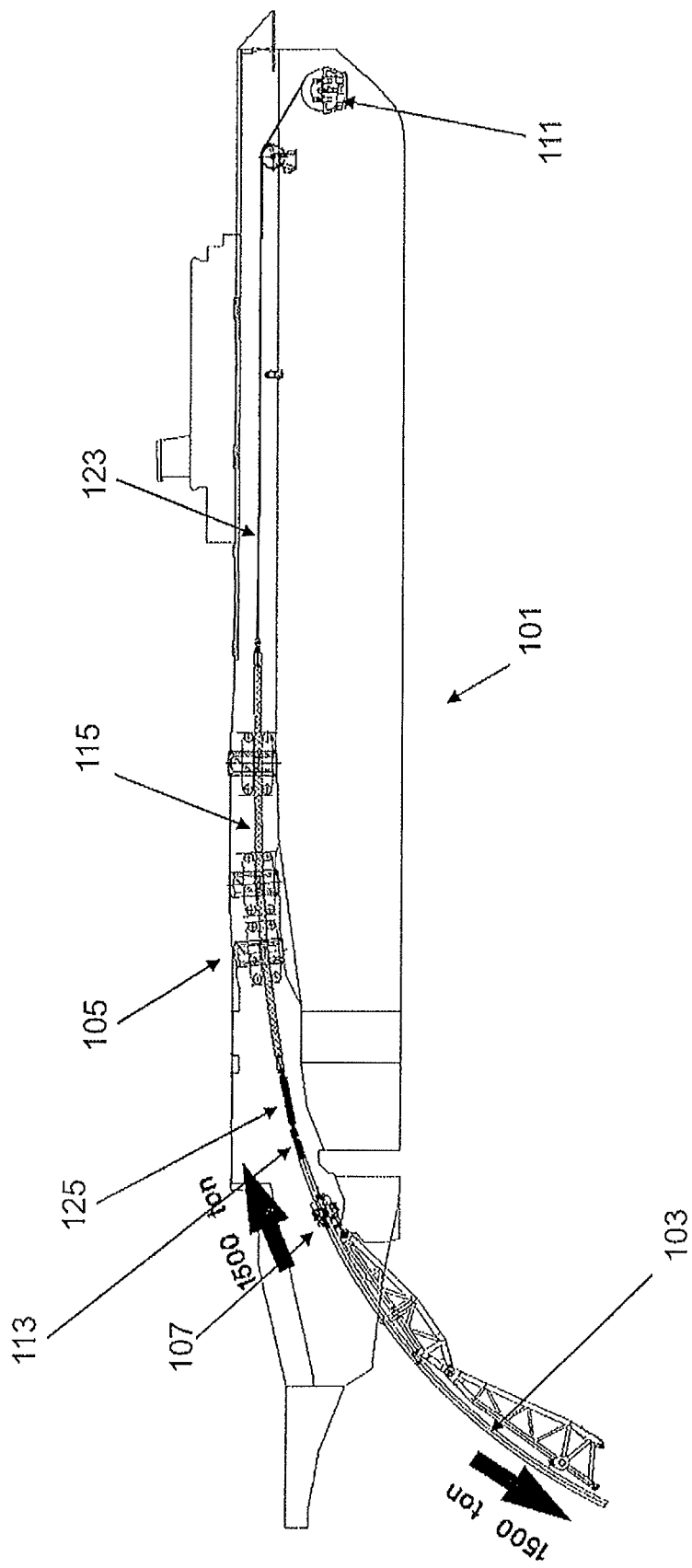
Figure 25:
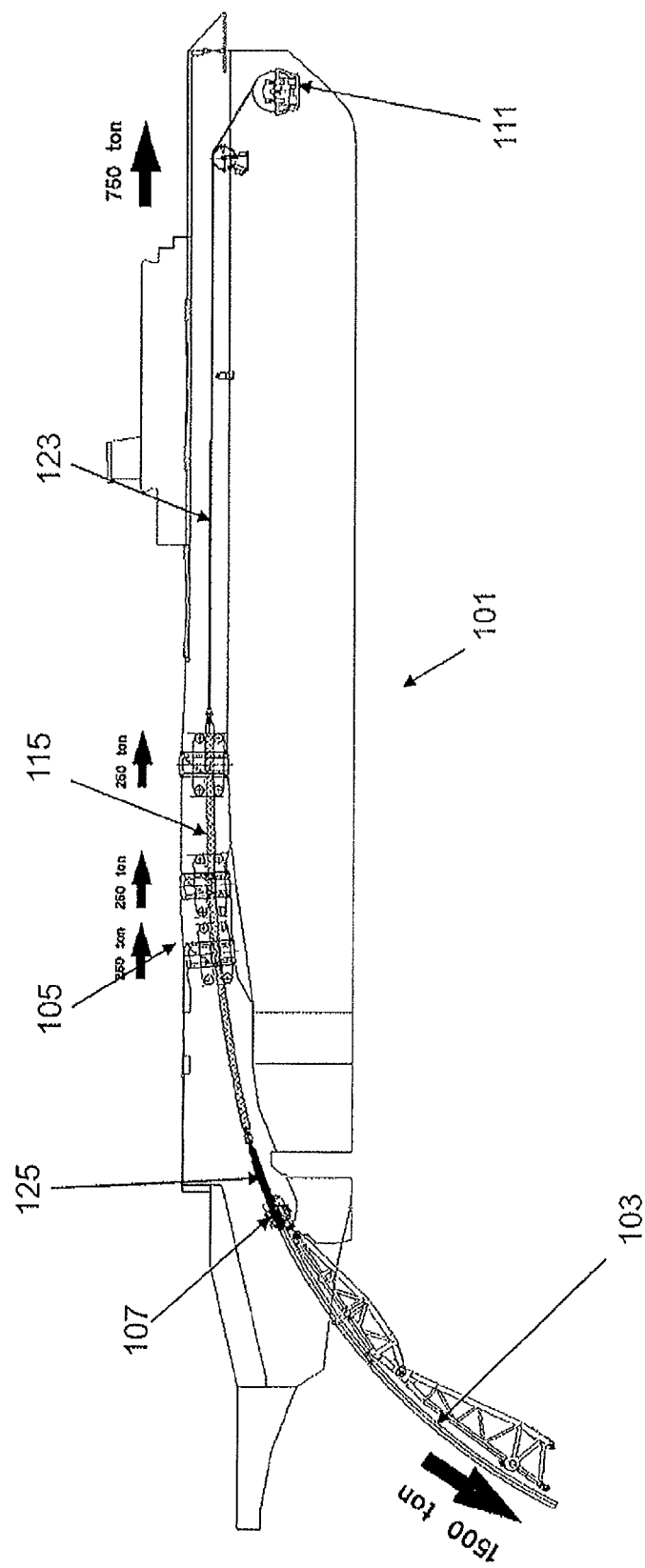

The A/R system is now ready to lower the pipeline 103; the microindentation clamp is released such that the 1500 ton tensional load is taken by the tensioners (750 tons) and the winch (750 tons)—see FIGS. 24 to 25. As a result of a tubular member (in this case the connector member 115) being received in the tensioners 5, some of the tensional load can be taken by the tensioners. In addition, the pipeline 103 is coupled to the winch 111 and the winch can therefore also take some of the load. This mitigates the need more multiple and/or high capacity winch apparatus as may be used in conventional arrangements.

Figure 26:
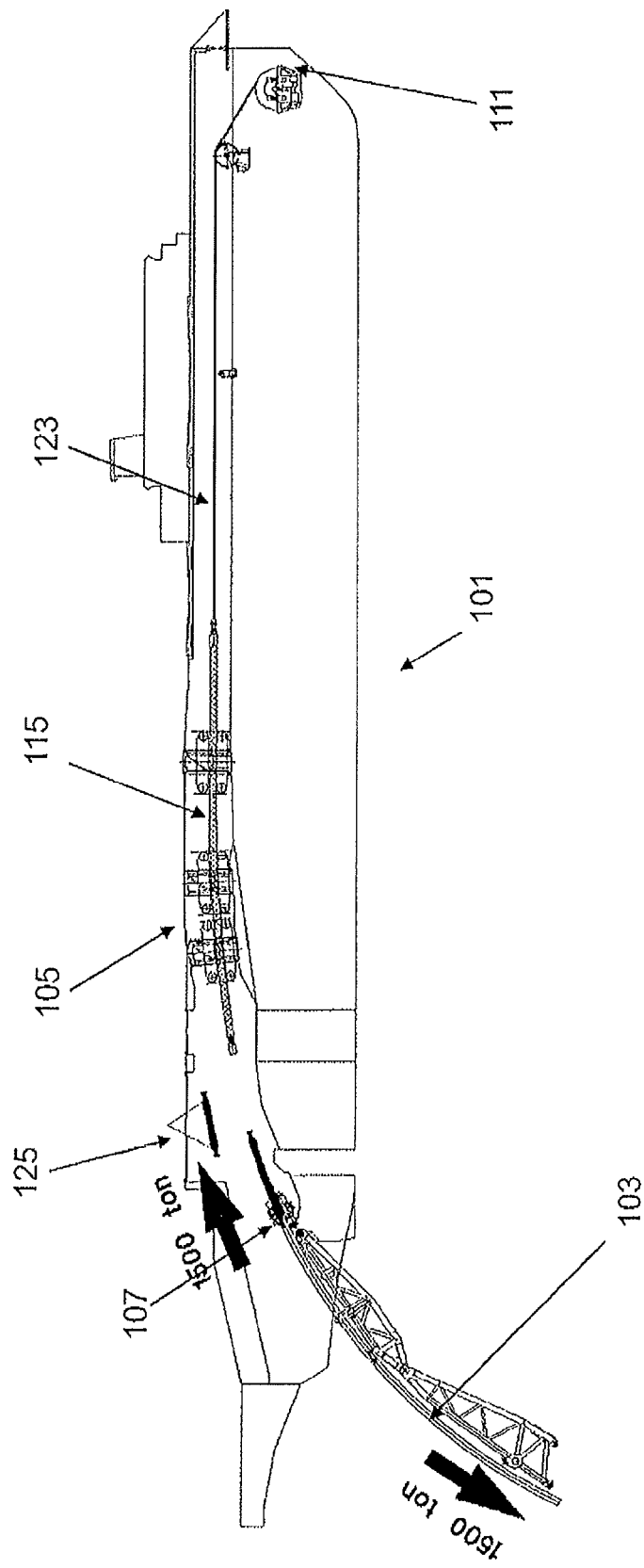
Figure 27:
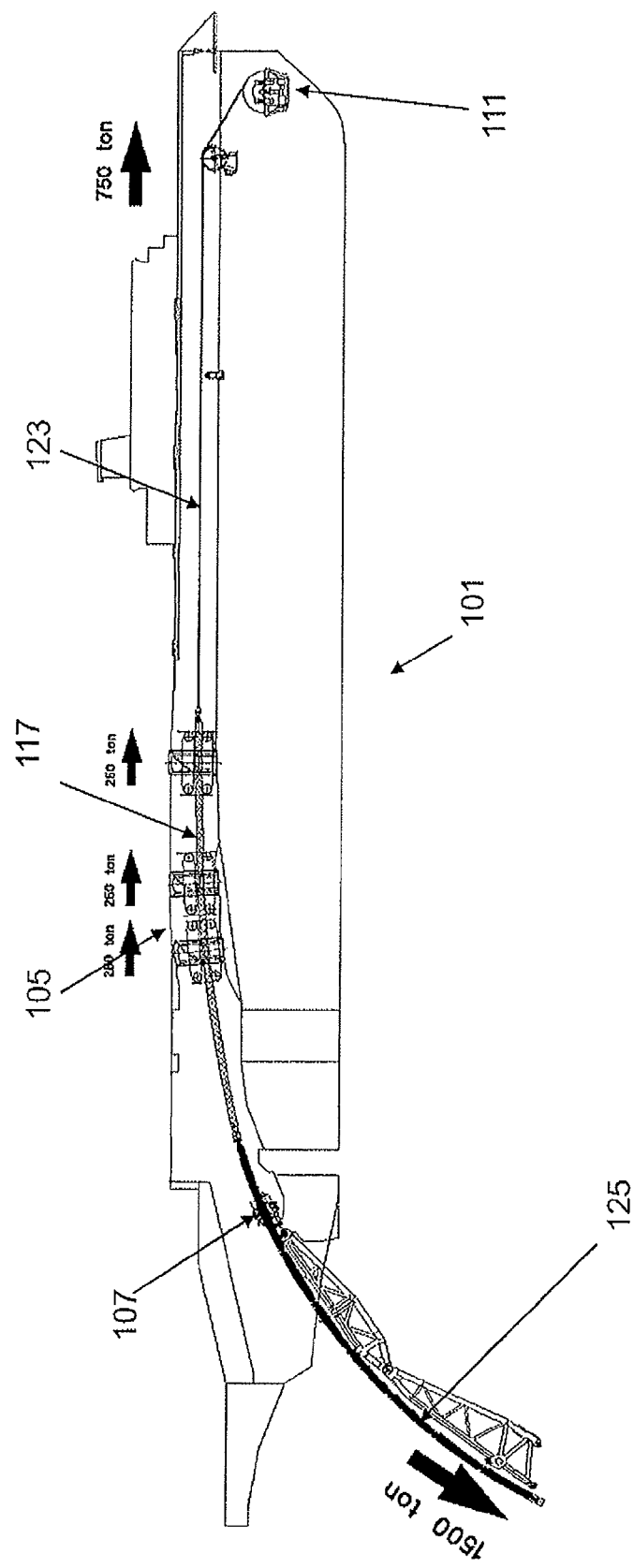

The abandoning procedure can be continued by adding further dummy pipes 125 above the end of the pipeline 103 and repeatedly lowering the pipeline 103 by the length of the dummy pipe 125. The second dummy pipe is shown in FIG. 26, and subsequent pipes are shown in FIG. 27.

Another embodiment (not shown), is similar to the second embodiment except that the connector member 115 is instead formed from a connector member, and two fitted pipe sections attached thereto. The connector member and first fitted pipe are attached together are then shifted forward in the line up. A second fitted pipe is added upstream on the line up. The second fitted pipe has a flush end for a welding connection to the adjacent end of the first fitted pipe and a padeye at the opposing end for coupling to the winch line. The first fitted pipe section comprises a bulbous head that can be fitted with an enclosure connection to the end of the connector member. This embodiment reduces the need to carry/store a single, large connector member.

Whilst the present invention has been described and illustrated with reference to particular embodiments, it will be appreciated by those of ordinary skill in the art that the invention lends itself to many different variations not specifically illustrated herein. For example, spacer members may be coupled together using a number of different approaches such as by welding or by using a Merlin connector. The connector member need not necessarily have jaws for coupling to a spacer member. For example the connector member may comprise a ballgrab for inserting into the end of a spacer member, or any other type of internal friction clamp.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of abandoning a pipeline from an offshore vessel, wherein the method comprises the steps of:
   providing a tubular member between a winch apparatus and the end of the pipeline being abandoned, the tubular member being received in a tensioning apparatus,
   lowering the pipeline with the winch apparatus and the tensioning apparatus at the same time, the tensional load of the pipeline being held by the tensioning apparatus and the winch apparatus at the same time during lowering, and
   uncoupling the winch apparatus from the tubular member at the end of the pipeline and abandoning the pipeline on the sea floor.

2. The method according to claim 1, wherein the tensional load is greater than the load capacity of the winch apparatus.

3. The method according to claim 1, wherein the tensional load is distributed substantially evenly between the winch apparatus and the tensioning apparatus.

4. The method according to claim 1, wherein the pipeline has been laid using an S-lay method.

5. The method according to claim 1, comprising the steps of:
   (i) inserting a spacer member upstream of the end of the pipeline,
   (ii) lowering the pipeline by the length of the spacer member, and
   further comprising repeatedly performing steps (i) to (ii) with a plurality of spacer members.

6. The method according to claim 5, wherein step (i) comprises the step of releasably coupling the winch apparatus to the spacer member with a connector.

7. The method according to claim 5, wherein the step of inserting the spacer members comprises the step of releasably coupling together the spacer member to an adjacent spacer member.

8. The method according to claim 5, wherein the spacer members are inserted upstream of the tensioning apparatus such that the tubular member comprises at least one spacer member.

9. The method according to claim 5, wherein the spacer members are inserted downstream of the tensioning apparatus.

10. The method according to claim 5, comprising the step of attaching an A/R head to an end of the pipeline, subsequent steps of the method being so performed that the A/R head is releasably connected to a spacer member such that that spacer member is configured so that it can be detached from the A/R head when the pipe has been abandoned.

11. The method according to claim 1, comprising the step of holding the pipeline, prior to lowering the pipeline with the winch apparatus and the tensioning apparatus.

12. A vessel comprising an A/R system for carrying out the method of abandoning a pipeline according to claim 1.

13. The vessel according to claim 12, comprising a winch apparatus, a tensioning apparatus and a tubular member connected between the winch apparatus and the end of the pipeline, the tubular member being received in the tensioning apparatus such that during abandonment/recovery the tensional load of a pipeline is distributed between the tensioning apparatus and the winch apparatus.

14. The vessel according to claim 13, comprising a holding apparatus for holding the pipeline.

15. The vessel according to claim 12, comprising a plurality of spacer members for inserting above the end of the pipeline, wherein the spacers are configured such that the pipeline may be lowered towards the seabed.

16. The vessel according to claim 15, comprising a connector member for releasably coupling the winch apparatus to a spacer member.

17. The vessel according to claim 16, wherein the connector member is receivable in the tensioning apparatus, and the connector member comprises a first end for connecting to the spacer member, and a second end for connecting to the winch line from the winch apparatus.

18. A connector member for use as the connector member in claim 16.

19. The vessel according to claim 15, wherein the connector enables the winch apparatus to be repeatedly coupled and de-coupled to/from the spacer members.

20. A kit of parts for use in the method of claim 1 comprising:
   a plurality of spacer members;

a tubular member; and a connector for releasably coupling a winch apparatus to a spacer member.

21. A method of recovering a pipeline from an offshore vessel, wherein the method comprises the steps of:

providing a tubular member between a winch and the end of the pipeline being recovered, the tubular member being received in a tensioning apparatus, raising the pipeline with the winch and the tensioning apparatus at the same time, the tensional load of the pipeline being held by the tensioning apparatus and the winch at the same time during raising, and coupling a winch apparatus to a tubular member at the end of an abandoned pipeline on the sea floor.

* * * * *